United States Patent
Koutani et al.

(10) Patent No.: US 7,212,219 B2
(45) Date of Patent: May 1, 2007

(54) DRAWING APPARATUS AND METHOD, PROGRAM AND RECORDING MEDIUM

(75) Inventors: Taizo Koutani, Tokyo (JP); Masayuki Ishikawa, Chiba (JP)

(73) Assignee: Sony Corporation (JP)

( * ) Notice: Subject to any disclaimer, the term of this patent is extended or adjusted under 35 U.S.C. 154(b) by 133 days.

(21) Appl. No.: 11/012,465

(22) Filed: Dec. 15, 2004

(65) Prior Publication Data

US 2005/0219266 A1     Oct. 6, 2005

(30) Foreign Application Priority Data

Dec. 19, 2003     (JP)     ............... 2003-423003

(51) Int. Cl.
*G09G 5/00*     (2006.01)
(52) U.S. Cl. ............................................... 345/660
(58) Field of Classification Search ........ 345/660–671, 345/698, 699, 2.1, 2.2, 2; 382/293, 295
See application file for complete search history.

(56) References Cited

U.S. PATENT DOCUMENTS

| 4,849,907 A | * | 7/1989 | Aotsu et al. ................. 345/626 |
| 5,897,644 A | * | 4/1999 | Nielsen ....................... 715/513 |
| 5,898,419 A | * | 4/1999 | Liu ............................. 345/660 |
| 5,913,920 A | * | 6/1999 | Adams et al. ............... 709/204 |
| 6,011,863 A | * | 1/2000 | Roy ............................ 382/154 |
| 6,313,846 B1 | * | 11/2001 | Fenney et al. .............. 345/552 |
| 6,556,724 B1 | * | 4/2003 | Chang et al. ............... 382/299 |

FOREIGN PATENT DOCUMENTS

JP     05-103325 A     4/1993

\* cited by examiner

*Primary Examiner*—Ryan Yang
(74) *Attorney, Agent, or Firm*—Lerner, David, Littenberg, Krumholz & Mentlik, LLP

(57) ABSTRACT

Accurate drawing without position displacement is performed irrespective of different aspect ratios on the transmission side of drawing information and on the reception side. In a drawing apparatus 50, a normalized coordinate transformation section 62 transforms normalized coordinates $(x_3, y_3)$ transmitted via a network into rear coordinates $(x_2, y_3)$ in accordance with an inverse function $g_1^{-1}$ of a function $g_1$ for normalizing an aspect ratio of an image displayed on a display, and a rear coordinate transformation section 63 transforms the rear coordinates $(x_2, y_2)$ into front coordinates $(x_1, y_1)$ in accordance with an inverse function $f_1^{-1}$ of a function f1 corresponding to the aspect ratio of the image. A drawing section 67 draws an image on the screen of the display in accordance with the front coordinates $(x_1, y_1)$. The invention is applicable, for example, to an application sharing drawing information.

10 Claims, 15 Drawing Sheets

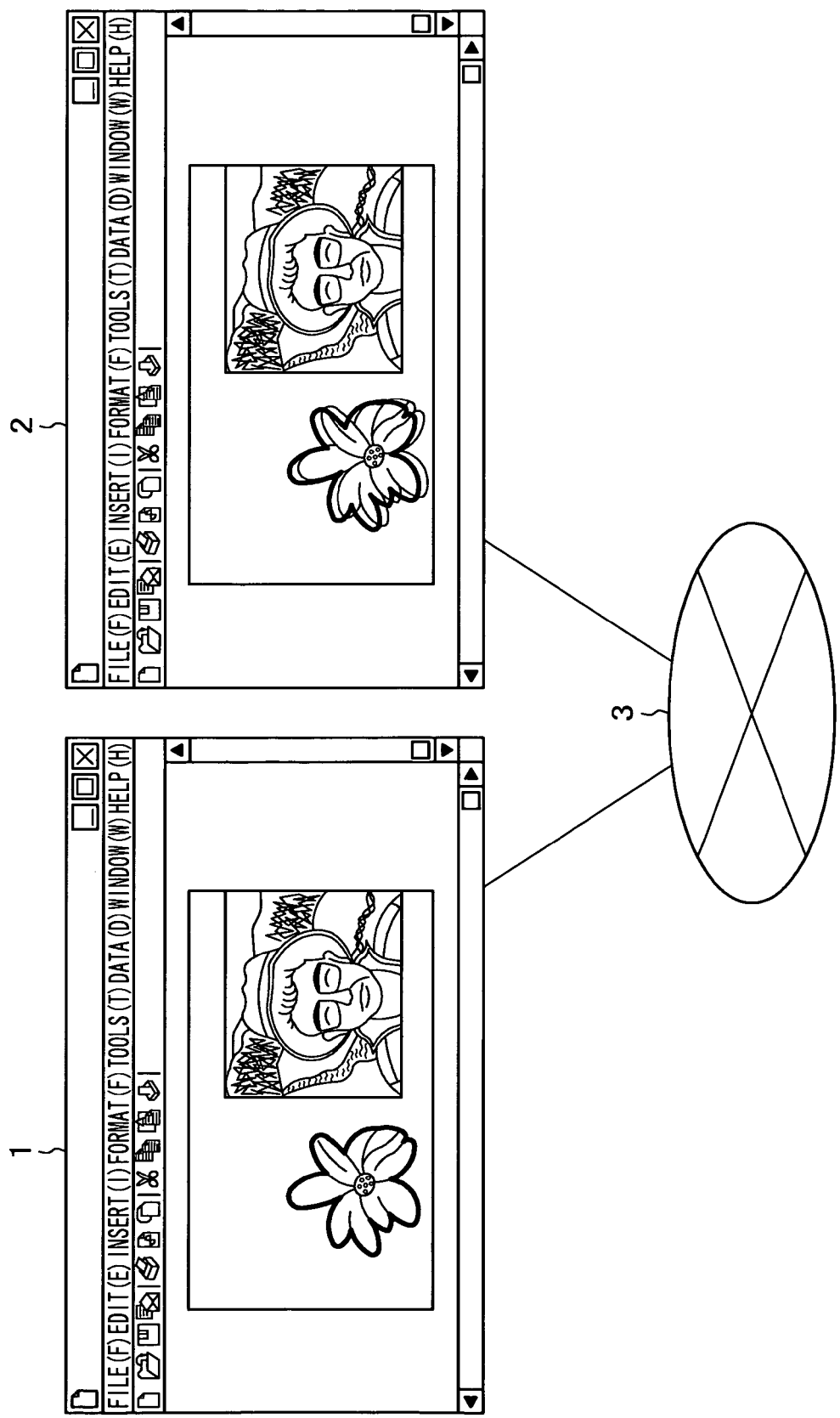

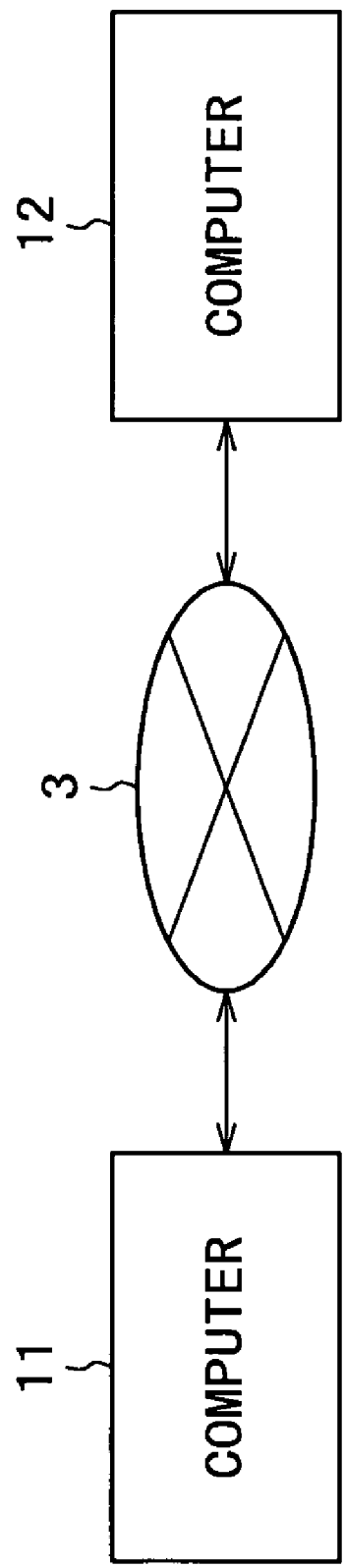

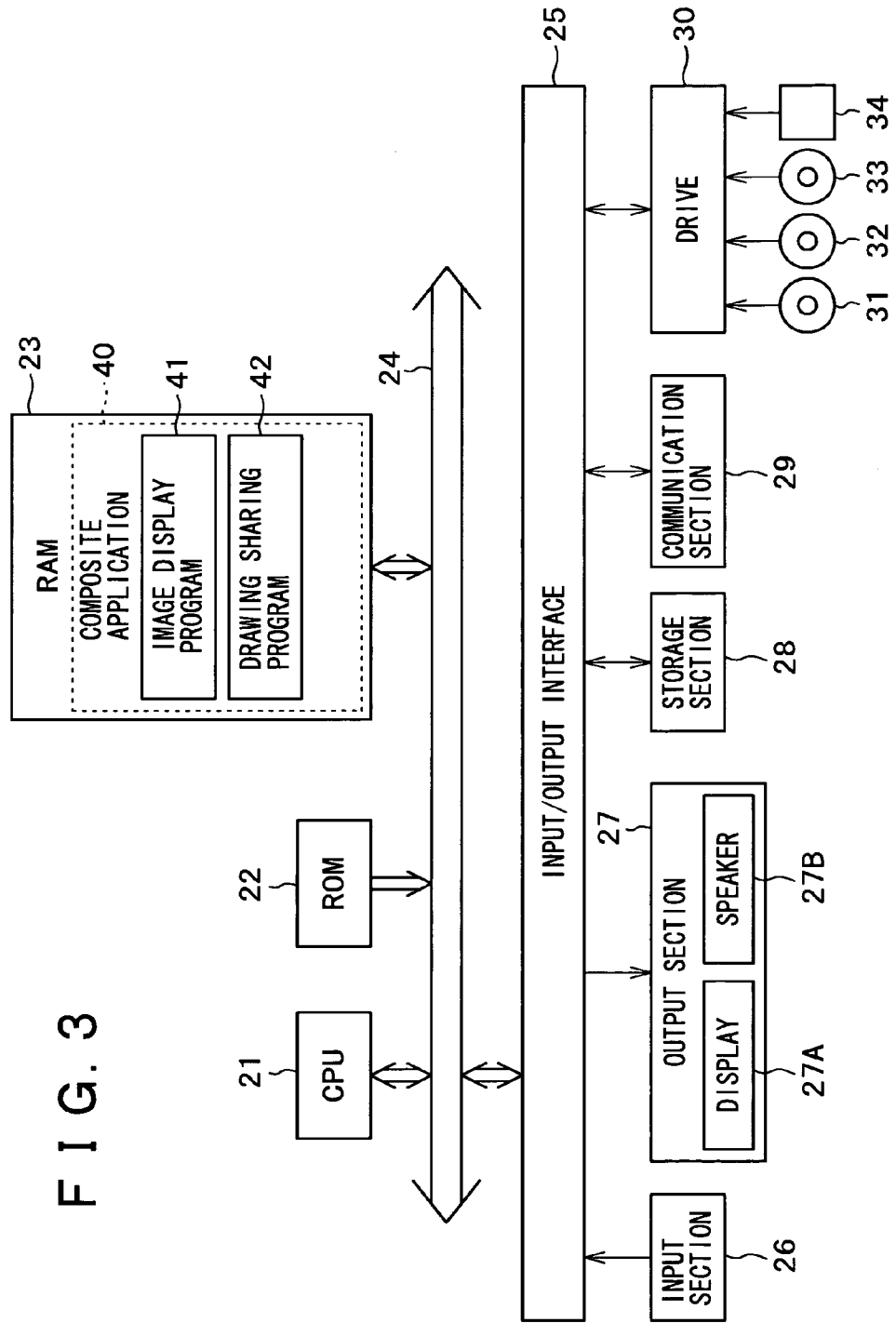

F I G. 4
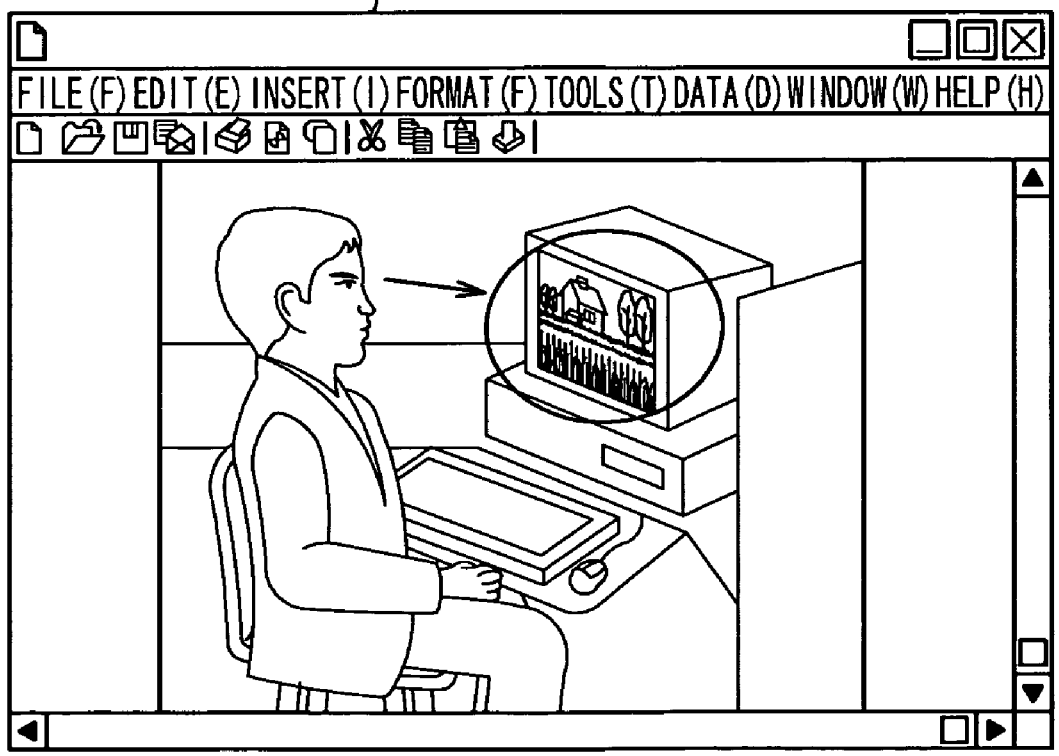

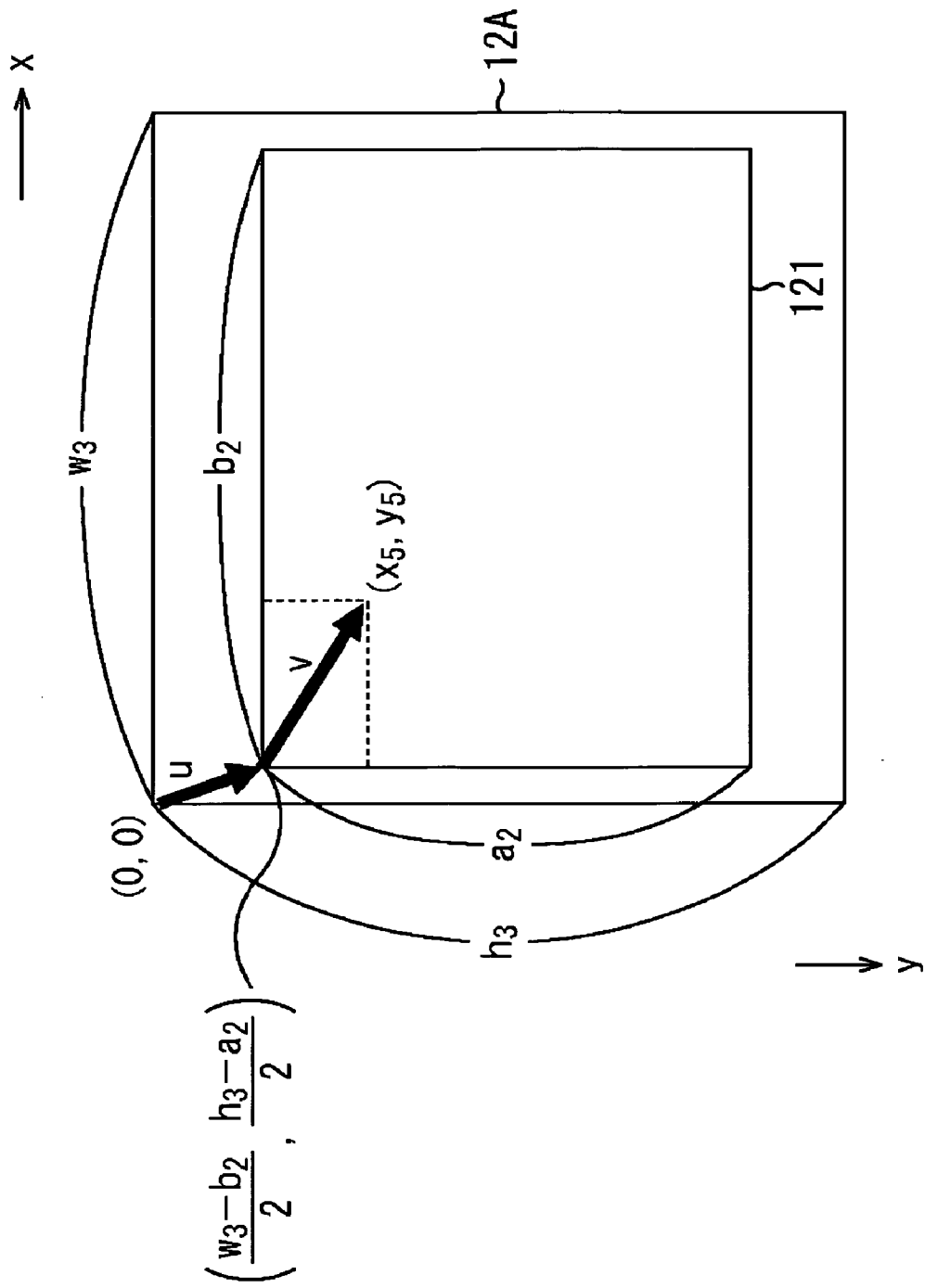

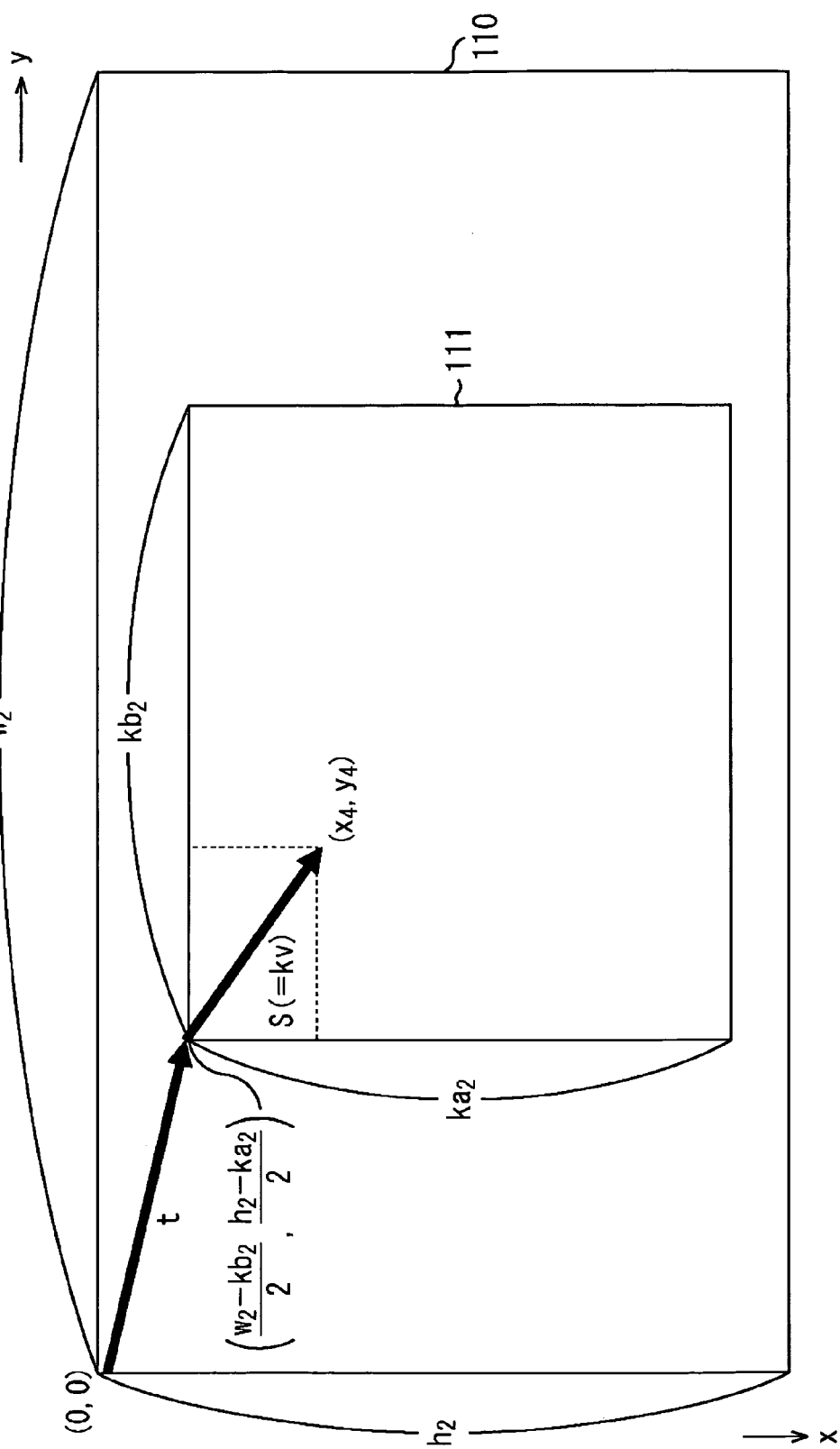

F I G. 1 2
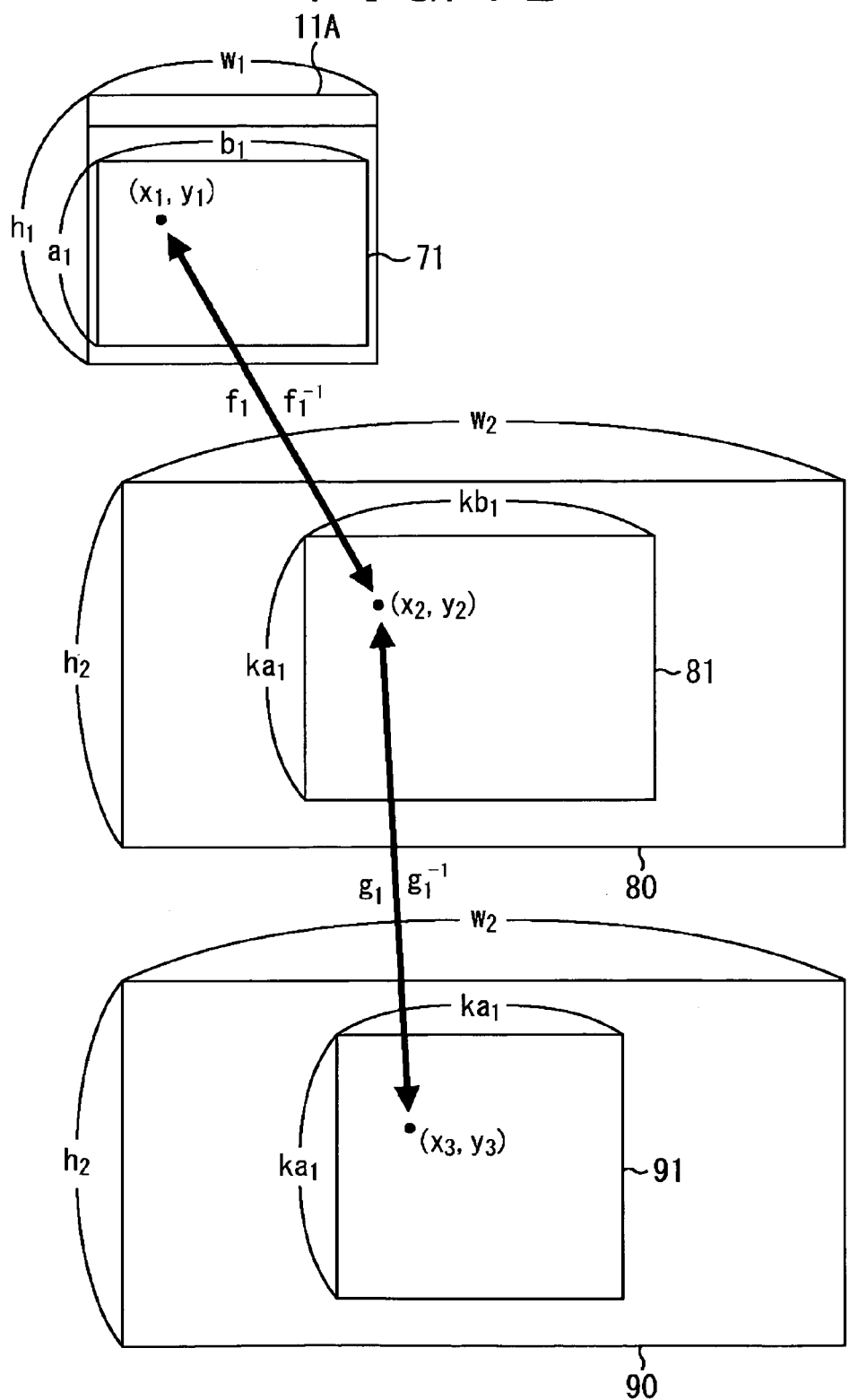

DRAWING APPARATUS AND METHOD, PROGRAM AND RECORDING MEDIUM

CROSS REFERENCES TO RELATED APPLICATONS

The present document is based on Japanese Priority Document JP2003-423003, filed to the Japanese Patent Office on Dec. 19, 2003, the entire content of which being incorporated herein by reference to the extent permitted by law.

BACKGROUND OF THE INVENTION

1. Field of the Invention

The present invention relates to a drawing apparatus and method, a program and a recording medium, and more particularly to a drawing apparatus and method, a program and a recording medium wherein accurate drawing is possible by using drawing information shared on a network, irrespective of aspect differences between transmission and reception sides.

2. Related Art

In drawing applications which make a number of users share drawing information via a network, for example, as drawing information of each user is transmitted to other users via the network, a synchronized screen (image) is displayed at all these users.

Image display applications have been known which applications synchronously display still images at a plurality of apparatuses interconnected via a network.

For example, MSN Messenger (a registered trademark) of Microsoft Corporation has a whiteboard sharing function. With this whiteboard sharing function, MSN Messenger shares drawing information at a plurality of user terminals (computers) and presents a synchronized screen display. Furthermore, MSN Messenger allows a plurality of terminals to share a screen which displays a pasted still image on which a new image is drawn. It can therefore be said that MSN Messenger is a composite application provided with both the function of a drawing application and the function of a still image display application.

Other composite applications provided with both the functions of the drawing application and image display application include, for example, a video conference system described in Japanese Patent Application Publication No. HEI-5-103325, for example.

MSN Messenger has a still image displaying function, whereas Windows Media Player (a registered trademark) of Microsoft Corporation has a moving image displaying function.

SUMMARY OF THE INVENTION

If content, i.e., images and drawing information, are shared by the composite application of the type described above at a plurality of apparatuses, displaying the content relies upon the function of the image display application of the composite application.

Namely, if the content is moving images among moving images and still images, in some cases the image display application displays even the same moving image at different aspect ratios on a plurality of apparatuses. Namely, a moving image is displayed on one apparatus at a horizontal/vertical ratio or an aspect ratio of, e.g., 16:9, whereas it is displayed on another apparatus at an aspect ratio of, e.g., 4:3.

If only the same moving image is to be synchronously displayed on a plurality of apparatuses, a difference between aspect ratios poses no problem.

However, with the above-described composite application sharing the content, i.e., images and drawing information, the position of an image drawn by using drawing information on a screen (image) is displaced in some cases, depending upon the difference of aspect ratios of a plurality of apparatuses.

FIG. 1 shows a display example by a composite application.

In FIG. 1, composite applications 1 and 2 are communicable via a network 3.

The composite applications 1 and 2 exchange sync information via the network 3 so that the same moving image can be displayed synchronously.

In this case, the composite application 1 displays the moving image at an aspect ratio of, e.g., 16:9, whereas the composite application 2 displays the same moving image (same content) at an aspect ratio of, e.g., 4:3.

In the state that the composite applications 1 and 2 synchronously display the same moving image, as a user of one of the composite applications 1 and 2 draws an image on the displayed moving image (screen), the drawing information of the image is transmitted to the other via the network 3, and an image corresponding to the drawing information is drawn at the other.

In FIG. 1, a user of the composite application 1 draws an image on the displayed moving image, the drawing information of the image is transmitted via the network to the composite application 2 which draws an image corresponding to the drawing information.

In FIG. 1, the moving image including a flower is displayed by using the composite applications 1 and 2, and the user of the composite application 1 draws a contour line of the flower.

In this case, the drawing information of the contour line of the flower is transmitted from the composite application 1 to the composite application 2 via the network 3. The composite application 2 draws an image in accordance with the drawing information. If the aspect ratios of the moving images displayed by the composite applications 1 and 2 are different, the coordinates of the image displayed by the composite application 1 take (relatively) different values from the coordinates of the image displayed by the composite application 2. As a result, the position of the image drawn by the composite application 2 is displaced from the position of the image drawn by the composite application 1.

In FIG. 1, since the aspect ratios of the composite applications 1 and 2 are different, irrespective of that the composite application 1 draws the contour line of the flower on the moving image, the composite application 2 draws a line at a position displaced from the contour of the flower on the moving image.

Displacement of the positions of images hinders comfortable information sharing (good mutual understanding) between the users of the composite applications 1 and 2.

The present invention has been made in consideration of the circumstances described above and enables accurate drawing without position displacement by using drawing information shared on a network, irrespective of an aspect difference between transmission and reception sides.

A first drawing apparatus of the present invention is characterized by: first transforming mechanism of transforming position information transmitted from another apparatus into first transformed position information in accordance with an inverse function of a first function for normalizing an aspect ratio of an image displayed on a display apparatus; second transforming mechanism of transforming the first transformed position information into second transformed position information in accordance with an inverse function of a second function corresponding to the aspect ratio of the image and being different from the first function; and drawing mechanism of drawing an image on a screen of the display apparatus.

The first drawing apparatus may further have: third transforming mechanism of transforming drawing input position information representative of a position, on the screen of the display apparatus, of a drawing input by a user into third transformed position information in accordance with the second function; fourth transforming mechanism of transforming the third transformed position information into fourth transformed position information in accordance with the first function; and transmitting mechanism of transmitting the fourth transformed position information to the other apparatus via a network.

A first drawing method of the present invention is characterized by: a first transforming step of transforming position information transmitted from another apparatus into first transformed position information in accordance with a first function for normalizing an aspect ratio of an image displayed on a display apparatus; a second transforming step of transforming the first transformed position information into second transformed position information in accordance with a second function corresponding to the aspect ratio of the image and being different from the first function; and a drawing step of drawing an image on a screen of the display apparatus.

A first program of the present invention is characterized by: a first transforming step of transforming position information transmitted from another apparatus into first transformed position information in accordance with a first function for normalizing an aspect ratio of an image displayed on a display apparatus; a second transforming step of transforming the first transformed position information into second transformed position information in accordance with a second function corresponding to the aspect ratio of the image and being different from the first function; and a drawing step of drawing an image on a screen of the display apparatus.

A program recorded in a first recording medium of the present invention is characterized by: a first transforming step of transforming position information transmitted from another apparatus into first transformed position information in accordance with a first function for normalizing an aspect ratio of an image displayed on a display apparatus; a second transforming step of transforming the first transformed position information into second transformed position information in accordance with a second function corresponding to the aspect ratio of the image and being different from the first function; and a drawing step of drawing an image on a screen of the display apparatus.

A second drawing apparatus of the present invention is characterized by: first transforming mechanism of transforming drawing input position information representative of a position of a drawing input by a user into first transformed position information in accordance with a second function corresponding to an aspect ratio of an image displayed on a display apparatus and being different from a first function for normalizing the aspect ratio of the image; second transforming mechanism of transforming the first transformed position information into second transformed position information in accordance with the first function; and transmitting mechanism of transmitting the second transformed position information to another apparatus via a network.

A second drawing method of the present invention is characterized by: a first transforming step of transforming drawing input position information representative of a position of a drawing input by a user into first transformed position information in accordance with a second function corresponding to an aspect ratio of an image displayed on a display apparatus and being different from a first function for normalizing the aspect ratio of the image; a second transforming step of transforming the first transformed position information into second transformed position information in accordance with the first function; and a transmitting step of transmitting the second transformed position information to another apparatus via a network.

A second program of the present invention is characterized by: a first transforming step of transforming drawing input position information representative of a position of a drawing input by a user into first transformed position information in accordance with a second function corresponding to an aspect ratio of an image displayed on a display apparatus and being different from a first function for normalizing the aspect ratio of the image; a second transforming step of transforming the first transformed position information into second transformed position information in accordance with the first function; and a transmitting step of transmitting the second transformed position information to another apparatus via a network.

A program recorded in a second storage medium of the present invention is characterized by: a first transforming step of transforming drawing input position information representative of a position of a drawing input by a user into first transformed position information in accordance with a second function corresponding to an aspect ratio of an image displayed on a display apparatus and being different from a first function for normalizing the aspect ratio of the image; a second transforming step of transforming the first transformed position information into second transformed position information in accordance with the first function; and a transmitting step of transmitting the second transformed position information to another apparatus via a network.

In the first drawing apparatus and drawing method, program and recording medium of the present invention, the position information transmitted from the other apparatus is transformed into the first transformed position information in accordance with the first function for normalizing the aspect ratio of the image displayed on the display apparatus, and the first transformed position information is transformed into the second transformed position information in accordance with the second function corresponding to the aspect ratio of the image. In accordance with the second transformed position information, an image is drawn on the screen of the display apparatus.

In the second drawing apparatus and drawing method, program and recording medium of the present invention, the drawing input position information representative of the position of the drawing input by the user is transformed into the first transformed position information in accordance with the second function corresponding to the aspect ratio of the image displayed on the display apparatus and being different from the first function for normalizing the aspect ratio of the image, and the first transformed position information is transformed into the second transformed information. The second transformed position information is transmitted via the network to the other apparatus.

According to the preferred embodiments of the present invention, it is possible to prevent displacement of a drawing position in order to establish a desirable mutual understanding between communicating parties.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 1 is a diagram illustrating drawing by a conventional composite application;

FIG. 2 is a block diagram showing an example of the structure of a drawing sharing system according to a preferred embodiment of the present invention;

FIG. 3 is a block diagram showing an example of the hardware structure of a computer 11;

FIG. 4 is a diagram showing a display example of a window 11A;

FIG. 10 is a diagram illustrating a front coordinate system;

FIG. 11 is a diagram illustrating a rear coordinate system;

FIG. 12 is a diagram illustrating a normalized coordinate system;

DETAILED DESCRIPTION OF THE PREFERRED EMBODIMENTS OF THE PRESENT INVENTION

In the following description of the preferred embodiments of the present invention, the correspondence between the disclosed inventions and the embodiments is as follows. The description is used for confirming that the embodiments supporting the inventions described in this specification are described in the specification. Therefore, the embodiments described in this specification as not corresponding to some invention are not intended to mean that the embodiments do not correspond to an invention. Conversely, an embodiment described in this specification as corresponding to some invention is not intended to mean that the embodiment does not correspond to an invention other than some other invention, its variation, combinations of inventions, sub combinations, etc.

Further, the description is not intended to cover all the inventions described in the specification. In other words, it is not intended to deny the presence of inventions described in this specification but not claimed in this application, i.e., to deny the presence of inventions which may be divisionally submitted in the future and inventions emerging through corrections or amendments and additionally submitted in the future.

Figure 14:
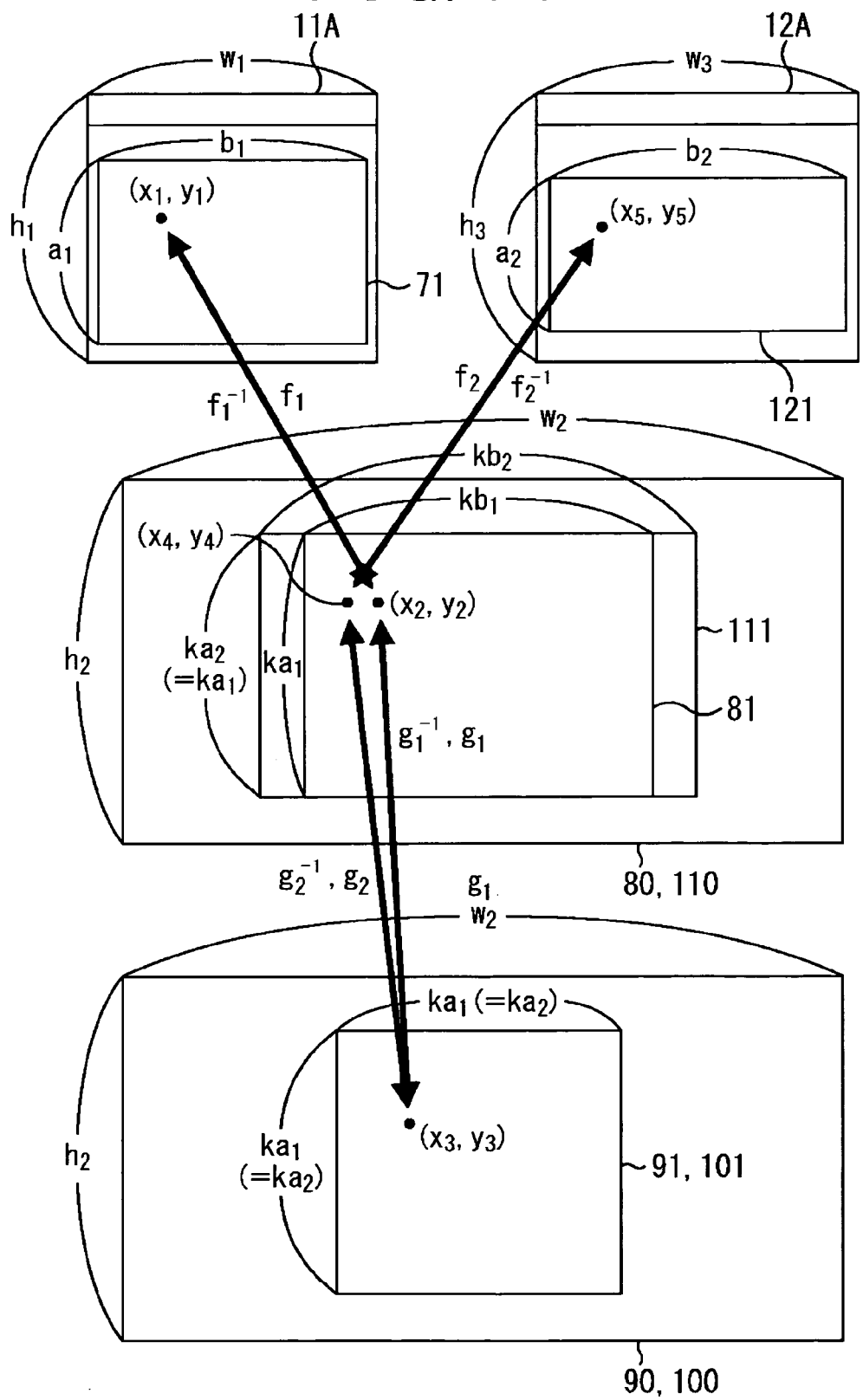
FIG. 14 is a diagram illustrating the process to be executed by drawing sharing sections 53 and 57.

A drawing apparatus described herein is characterized in that in a drawing apparatus (e.g., a drawing apparatus 50 of FIG. 5) for drawing an image on a screen of a display apparatus (e.g., a display 27A of FIG. 3) for displaying an image, in accordance with position information representative of a drawing position transmitted from another apparatus (e.g., a drawing apparatus 54 of FIG. 5) via a network (e.g., a network 3 of FIG. 5), the drawing apparatus includes: first transforming mechanism (e.g., a normalized coordinate transformation section 62 of FIG. 7) for transforming the position information (e.g., $(x_3, y_3)$ of FIG. 14) transmitted from the other apparatus into first transformed position information (e.g., $(x_2, y_2)$ of FIG. 14) in accordance with an inverse function of a first function (e.g., an inverse function $g_1^{-1}$ of a function g1 of FIG. 14) for normalizing an aspect ratio of an image displayed on the display apparatus; second transforming mechanism (e.g., a rear coordinate transformation section 63 of FIG. 7) for transforming the first transformed position information into second transformed position information (e.g., $(x_1, y_1)$ of FIG. 14) in accordance with an inverse function of a second function (e.g., an inverse function $f_1^{-1}$ of a function $f_1$ of FIG. 14) corresponding to the aspect ratio of the image and being different from the first function; and drawing means (a drawing section 67 of FIG. 7) for drawing an image on a screen of the display apparatus.

The drawing apparatus according to another aspect of the present invention is characterized by: third transforming mechanism (e.g., a front coordinate transformation section 64 of FIG. 7) for transforming drawing input position information (e.g., $(x_1, y_1)$ of FIG. 12) representative of a position, on the screen of the display apparatus, of a drawing input by a user into third transformed position information (e.g., $(x_2, y_2)$ of FIG. 12) in accordance with the second function; fourth transforming mechanism (e.g., a normalizing section 65 of FIG. 7) for transforming the third transformed position information into fourth transformed position information (e.g., $(x_3, y_3)$ of FIG. 12) in accordance with the first function; and transmitter (e.g., a transmission section 66 of FIG. 7) for transmitting the fourth transformed position information to the other apparatus via a network.

A drawing method according to another aspect of the present invention is characterized in that in a drawing method of drawing an image on a screen of a display apparatus (e.g., the display 27A of FIG. 3) for displaying an image, in accordance with position information representative of a drawing position transmitted from another apparatus (e.g., the drawing apparatus 54 of FIG. 5) via a network (e.g., the network 3 of FIG. 5), the drawing method includes: a first transforming step (e.g., Step S12 of FIG. 16) of transforming position information transmitted from another apparatus into first transformed position information in accordance with a first function for normalizing an aspect ratio of an image displayed on a display apparatus; a second transforming step (e.g., Step S13 of FIG. 16) of transforming the first transformed position information into second transformed position information in accordance with a second function corresponding to the aspect ratio of the image and being different from the first function; and a drawing step (e.g., Step S14 of FIG. 16) of drawing an image on a screen of the display apparatus.

A program and a program recorded in a recording medium according to another aspect of the present invention are characterized in that in a program for making a computer execute a drawing process of drawing an image on a screen of a display apparatus (e.g., the display 27A of FIG. 3) for displaying an image, in accordance with position information representative of a drawing position transmitted from another apparatus (e.g., the drawing apparatus 54 of FIG. 5) via a network (e.g., the network 3 of FIG. 5), the program having: a first transforming step (e.g., Step S12 of FIG. 16) of transforming position information transmitted from another apparatus into first transformed position information in accordance with a first function for normalizing an aspect ratio of an image displayed on a display apparatus; a second transforming step (Step S13 of FIG. 16) of transforming the first transformed position information into second transformed position information in accordance with a second function corresponding to the aspect ratio of the image and being different from the first function; and a drawing step (e.g., Step S14 of FIG. 16) of drawing an image on a screen of the display apparatus.

Figure 5:
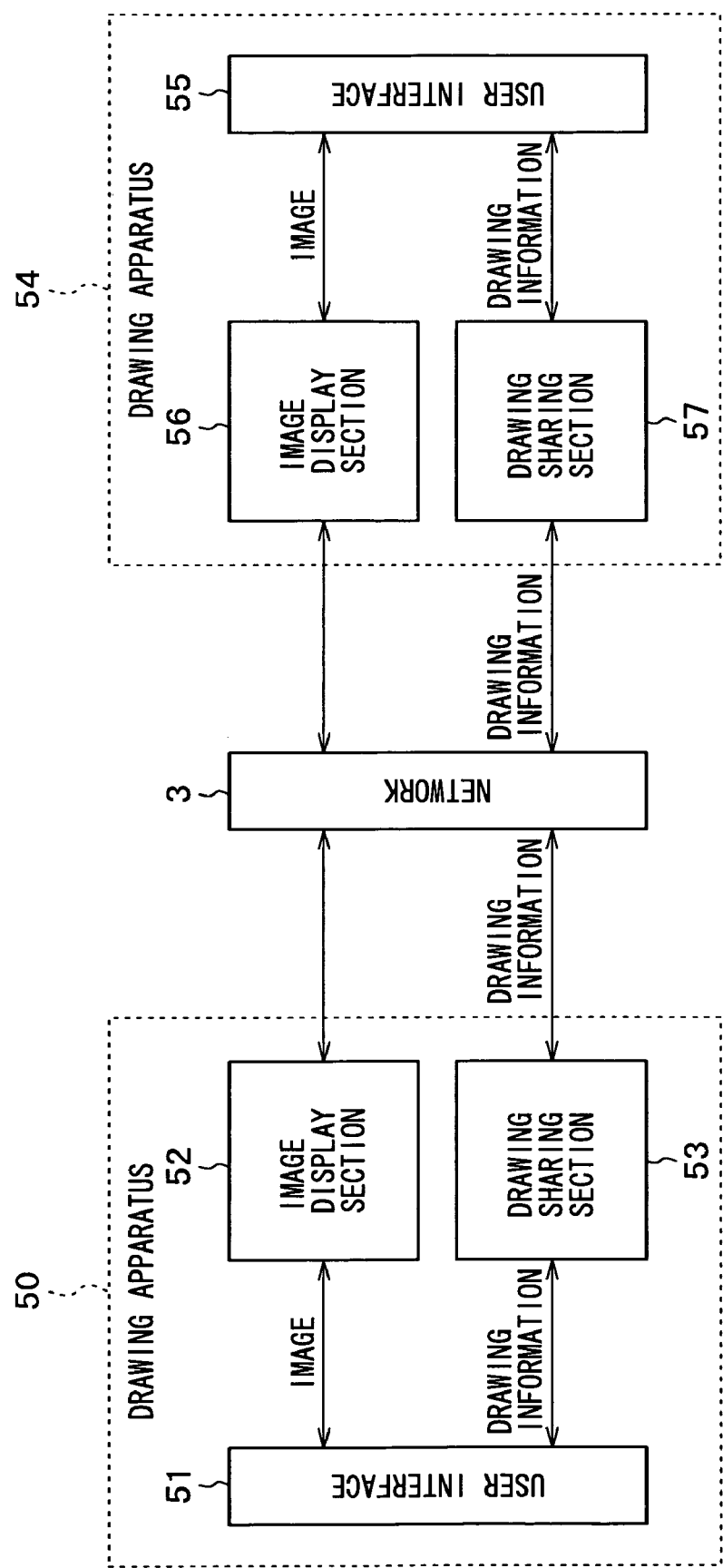
FIG. 5 is a block diagram showing an example of the structure of drawing apparatuses 50 and 54.

A drawing apparatus according to another aspect of the present invention is characterized in that in a drawing apparatus (e.g., the drawing apparatus 50 of FIG. 5) for drawing an image on a screen of a display apparatus (e.g., the display 27A of FIG. 3) for displaying an image in accordance with a drawing input by a user, the drawing apparatus includes: first transforming mechanism (e.g., the front coordinate transformation section 64 of FIG. 7) for transforming drawing input position information (e.g., (x1, y1) of FIG. 14) representative of a position of a drawing input by a user into first transformed position information (e.g., (x2, y2) of FIG. 14) in accordance with a second function (e.g., the function f1 of FIG. 12) corresponding to an aspect ratio of an image displayed on the display apparatus and being different from a first function (e.g., the function g1 of FIG. 12) for normalizing the aspect ratio of the image; second transforming mechanism (e.g., the normalizing section 65 of FIG. 7) for transforming the first transformed position information into second transformed position information (e.g., (x3, y3) of FIG. 14) in accordance with the first function; and transmitter (e.g., the transmission section 66 of FIG. 7) for transmitting the second transformed position information to another apparatus (e.g., a drawing apparatus 54 of FIG. 5) via a network (e.g., the network 3 of FIG. 5).

A drawing method according to another aspect of the present invention is characterized in that in a drawing method of drawing an image on a screen of a display apparatus for displaying an image in accordance with a drawing input by a user on the screen of the display apparatus, the drawing method includes: a first transforming step (e.g., Step S1 of FIG. 15) of transforming drawing input position information representative of a position of a drawing input by a user into first transformed position information in accordance with a second function corresponding to an aspect ratio of an image displayed on a display apparatus and being different from a first function for normalizing the aspect ratio of the image; a second transforming step (e.g., Step S2 of FIG. 15) of transforming the first transformed position information into second transformed position information in accordance with the first function; and a transmitting step (e.g., Step S3 of FIG. 15) of transmitting the second transformed position information to another apparatus via a network.

A program and a program recorded in a recording medium according to another aspect of the present invention are characterized in that in a program for making a computer execute a drawing process of drawing an image on a screen of a display apparatus for displaying image in accordance with a drawing input by a user on the screen of the display apparatus, the program includes: a first transforming step (e.g., Step S1 of FIG. 15) of transforming drawing input position information representative of a position of a drawing input by a user into first transformed position information in accordance with a second function corresponding to an aspect ratio of an image displayed on the display apparatus and being different from a first function for normalizing the aspect ratio of the image; a second transforming step (e.g., Step S2 of FIG. 15) of transforming the first transformed position information into second transformed position information in accordance with the first function; and a transmitting step (e.g., Step S3 of FIG. 15) of transmitting the second transformed position information to another apparatus via a network.

An example of preferred embodiment of the present invention will be described herein below.

FIG. 2 is a block diagram showing an example of the structure of a drawing sharing system according to a preferred embodiment of the present invention.

In FIG. 2, a computer 11 and a computer 12 are interconnected via a network 3 and can bidirectionally communicate with each other.

The computers 11 and 12 are each installed with a composite application (program) provided with both functions of a drawing application for drawing and an image display application for synchronously displaying an image, as will be later described.

For example, as the users of the computers 11 and 12 activate the composite application, predetermined windows are displayed on the computers 11 and 12. Sync information (e.g., such as time code) for synchronously displaying a moving image is exchanged between the computers 11 and 12. The same moving image is therefore displayed synchronously on the windows of the computers 11 and 12.

It is assumed herein that the moving image to be displayed on the computers 11 and 12 is stored, for example, in the computers 11 and 12, respectively. However, for example, a moving image may be stored in one of the computers 11 and 12, and the moving image is transmitted from one to the other via the network 3 so that the same moving image can be displayed synchronously on the computers 11 and 12. The computers 11 and 12 may receive a moving image from an unrepresented server on the network 3 to display the synchronous images.

For example, as a user of the computer 11 draws characters, figures or the like on the window displaying a moving image, the computer 11 transmits the drawing information of the drawn characters, figures or the like to the computer 12 via the network 3. The computer 12 receives the drawing information transmitted from the computer 11 via the network 3 and draws an image corresponding to the drawing information (displays the same characters, or figures drawn on the window of the computer 11).

Similarly, as a user of the computer 12 draws characters, figures or the like on the window displaying a moving image, the computer 12 transmits the drawing information of the drawn characters, figures or the like to the computer 11 via the network 3. The computer 11 receives the drawing information transmitted from the computer 12 via the network 3 and draws an image corresponding to the drawing information (displays the same characters, or figures drawn on the window of the computer 12).

The network 3 may be the Internet, a LAN (Local Area Network) or the like. The network 3 may either wired or wireless.

FIG. 3 is a block diagram showing an example of the hardware structure of the computer 11 shown in FIG. 2. The computer 12 of FIG. 2 has a similar hardware structure to that of the computer 11.

A CPU (Central Processing Unit) 21, a ROM (Read Only Memory) 22 and a RAM (Random Access Memory) 23 are interconnected via a bus 24. An input/output interface 25 is also connected to the bus 24.

Connected to the input/output interface 25 are an input section 26 constituted of a keyboard, a mouse and the like, an output section 27 constituted of a display 27A, a speaker 27B and the like, a storage section 28 constituted of a hard disk and the like, and a communication section 29.

When necessary, a drive 30 is also connected to the input/output interface 25. A magnetic disk 31, an optical disk 32, a magneto optical disk 33 or a semiconductor memory 34 is mounted on the drive when appropriate, and a program read from the media is installed in the storage section 28 when necessary.

A program storage medium for storing a program to be installed in the computer 11 and being executable by the computer 11 is constituted of a package medium, ROM 22 for temporarily or permanently storing the program, a hard disk constituting the storage section 28 or the like. The package medium is the magnetic disk (including a floppy disk) 31, the optical disk (including a CD-ROM (Compact Disk-Read Only Memory) and a DVD (Digital Versatile Disc)) 32, the magneto optical disk (MD (Mini-Disc) (a registered trademark)) 33, the semiconductor memory 34 or the like. Storing the program in the program storage medium is performed by utilizing wired or wireless communication media such as a local network, the Internet and digital satellite broadcasting, if necessary, via an interface such as a router and a modem.

The computer 11 executes various processes as CPU 21 executes the program installed in the storage section 28.

In FIG. 3, a composite application (program) 40 is installed in the storage section 28, the composite application 40 being provided with both functions of a drawing application for drawing by sharing drawing information and an image display application for synchronously displaying an image. The composite application 40 is constituted of an image display program (module) 41 for synchronously displaying an image (still image, moving image) and a drawing sharing program (module) 42 for sharing drawing information.

The storage section 28 also stores an image (of a moving image and a still image, the moving image is assumed to be used herein) to be displayed by the image display program 41.

In response to an instruction from, e.g., a user, CPU 21 loads the composite application 40 in RAM 23 as shown in FIG. 3 and executes it. The computer 11 functions therefore as a drawing apparatus for displaying a moving image synchronous with the other computer and drawing an image.

FIG. 4 shows a display example of a window 11A displayed on the display 27A when CPU 21 shown in FIG. 3 executes the composite application 40.

As the composite application 40 is executed, the window 11A is displayed on the display 27A.

As the composite application 40 is executed, a moving image stored in the storage section 28 is reproduced and displayed on the window 11A.

Further, as a user of the computer 11 operates the input section (mouse or the like) 26 to draw a circle on the moving image displayed on the window 11A and draw an arrow directing toward the circle, for example, the circle and arrow corresponding to this operation (drawing) are displayed on the window 11A, as shown in FIG. 4.

FIG. 5 shows an example of the structure of a drawing apparatus functionally realized as CPU 21 shown in FIG. 3 executes the composite application 40.

In FIG. 5, a drawing apparatus 50 corresponds to the computer 11 of FIG. 2, and a drawing apparatus 54 corresponds to the computer 12 of FIG. 2.

The drawing apparatus 50 corresponding to the computer 11 is constituted of a user interface 51, an image display section 52 and a drawing sharing section 53.

In the drawing apparatus 50, the user interface 51 corresponds to, e.g., the input section 26 and output section 27 of FIG. 3.

The image display section 52 exchanges sync information with an image display section 56 of the drawing apparatus 54 via the network 3 so that the content of a moving image stored in the storage section 28 (FIG. 3) are displayed synchronously with the drawing apparatus 54 on the window 11A of the display 27A of the output section 27 as the user interface 51.

As the user operates the input section 26 (FIG. 3) as the user interface 51 and draws an image on the window 11A, the drawing sharing section 53 draws characters, figures or the like (displays characters, figures or the like) corresponding to the user operation, on the window 11A of the display 27A of the output section 27 as the user interface 51. Further, the drawing sharing section 53 transmits drawing information of the image to the drawing apparatus 54 via the network 3.

The drawing sharing section 53 receives drawing information transmitted from the drawing apparatus 54 via the network 3 and draws characters, figures or the like (displays characters, figures or the like) on the window 11A of the display 27A of the output section 27 as the user interface 51.

The image display section 52 and drawing sharing section 53 correspond to the image display program 41 and drawing sharing program 42 of FIG. 3, respectively.

The drawing apparatus 54 corresponding to the computer 12 is constituted of a user interface 55, an image display section 56 and a drawing sharing section 57. The user interface 55, image display section 56 and drawing sharing section 57 are structured in a manner similar to that of the above-described user interface 51, image display section 52 and drawing sharing section 53, and the description thereof is therefore omitted.

Figure 6:
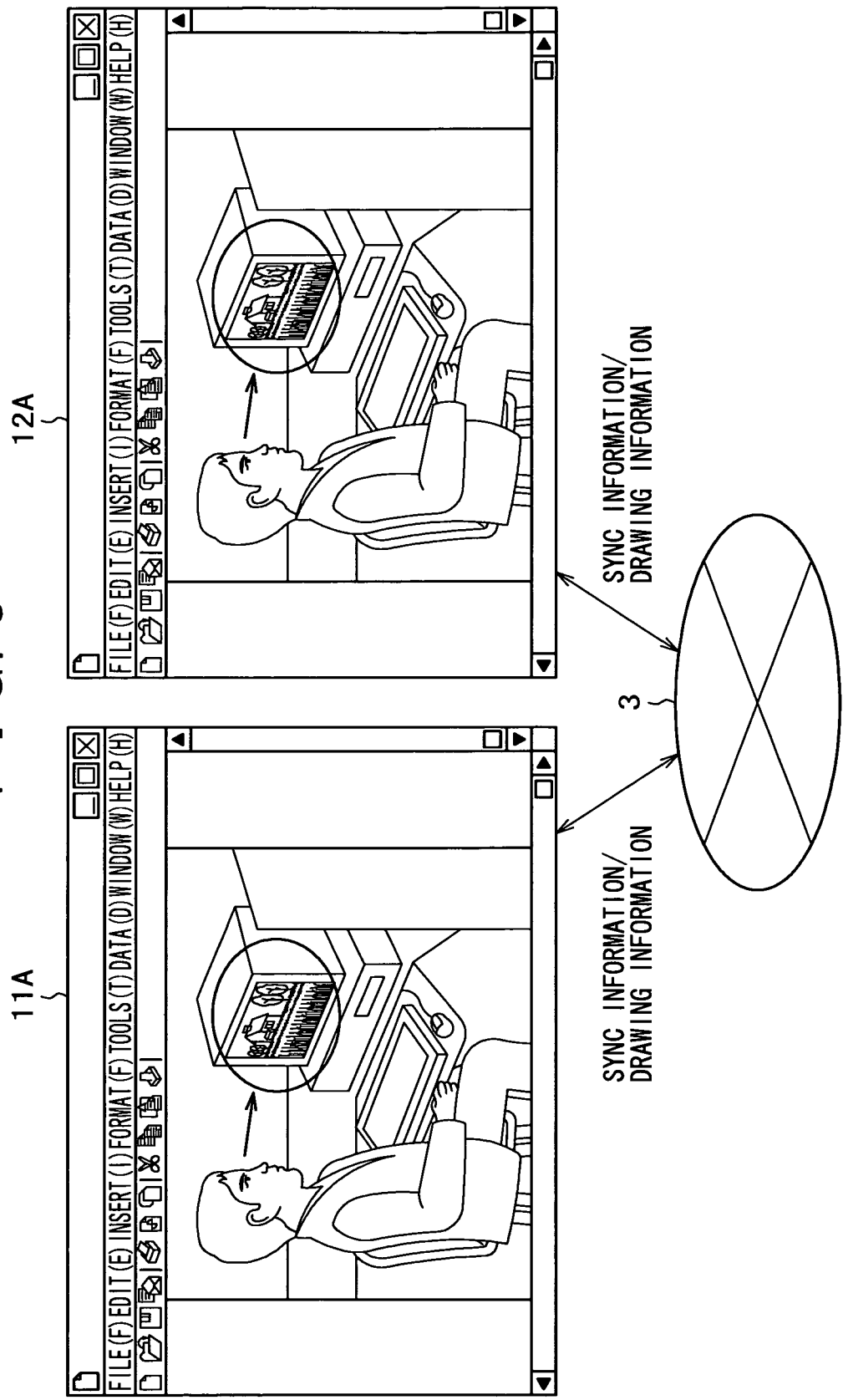
FIG. 6 is a diagram showing display examples of windows 12A and 12A.

FIG. 6 shows a display example of the windows displayed on the drawing apparatuses 50 and 54 of FIG. 5.

The drawing apparatus 50 displays the window 11A on the display 27A of the output section 27 as the user interface 51. Similarly, the drawing apparatus 54 displays the window 12A on the display 27A of the output section 27 as the user interface 55.

The image display section 52 of the drawing apparatus 50 of FIG. 5 exchanges sync information with the image display section 56 of the drawing apparatus 54 via the network 3, so that the same moving image is synchronously displayed on the window 11A of the drawing apparatus 50 and on the window 12A of the drawing apparatus 54.

The aspect ratios of the moving image displayed on the windows 11A and 12A are dependent upon, for example, the drawing apparatuses 50 and 54 and the like. Therefore, the aspect ratios of the moving image displayed on the windows 11A and 12A are the same in one case and different in the other case.

In FIG. 6, a user of the drawing apparatus 50 draws a circle on the window 11A and an arrow directing toward the circle, for example. In this case, the drawing sharing section 53 of the drawing apparatus 50 transmits the drawing information of the drawn circle and arrow to the drawing apparatus 54 via the network 3.

The drawing sharing section 57 of the drawing apparatus 54 receives the drawing information transmitted from the drawing sharing section 53 of the drawing apparatus 50 via the network 3. The drawing sharing section 57 displays on the window 12A the same circle and arrow as those drawn on the window 11A by the user of the drawing apparatus 50, synchronously with the drawing by the user of the drawing apparatus 50.

As the user of the drawing apparatus 54 draws an image on the window 12A, the drawing sharing section 57 transmits the drawing information of the image to the drawing sharing section 53 via the network 3. The drawing sharing section 53 receives the drawing information from the drawing sharing section 57 and draws the image on the window 11A in accordance with the drawing information.

In the manner described above, synchronized images are drawn on the windows 11A and 12A.

Figure 7:
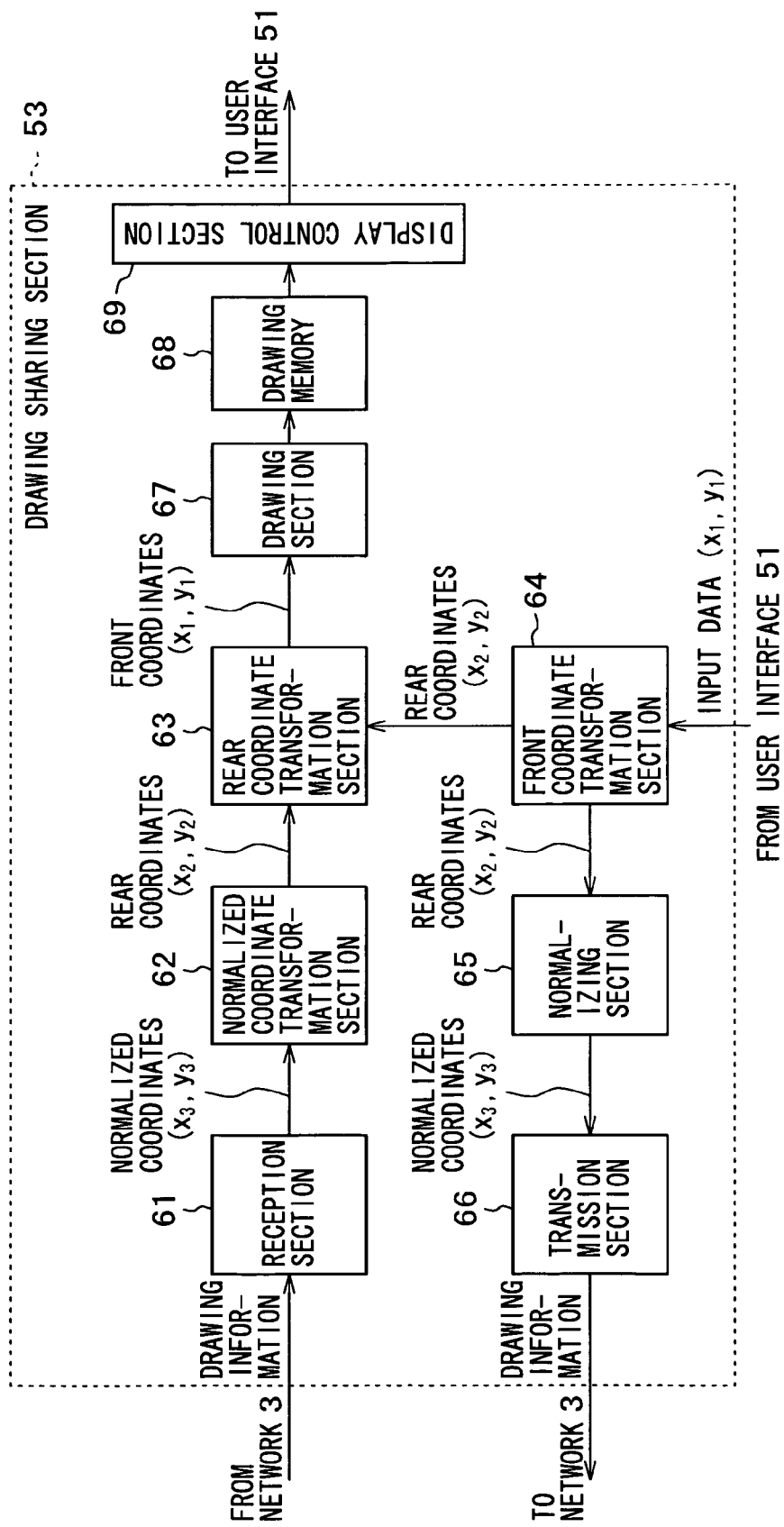
FIG. 7 is a block diagram showing an example of the structure of a drawing sharing section 53.

FIG. 7 is a block diagram showing an example of the structure of the drawing sharing section 53.

The drawing sharing section 57 of FIG. 5 is structured in a similar manner.

A reception section 61 is supplied with drawing information transmitted from the drawing apparatus 54 via the network 3. The reception section 61 receives the drawing information transmitted via the network 3 and supplies normalized coordinates ($x_3$, $y_3$) contained in the drawing information to be described later to a normalized coordinate transformation section 62.

The normalized coordinate transformation section 62 transforms the normalized coordinates ($x_3$, $y_3$) supplied from the reception section 61 into rear coordinates ($x_2$, $y_2$) to be described later, and supplies them to a rear coordinate transformation section 63.

The rear coordinate transformation section 63 is supplied with the rear coordinates ($x_2$, $y_2$) from the normalized coordinate transformation section 62 and also with rear coordinates ($x_2$, $y_2$) from a front coordinate transformation section 64 to be described later. The rear coordinate transformation section 63 transforms the rear coordinates ($x_2$, $y_2$) supplied from the normalized coordinate transformation section 62 or front coordinate transformation section 64 into front coordinates ($x_1$, $y_1$) to be described later, and supplies them to a drawing section 67.

The front coordinate transformation section 64 is supplied via the user interface 51 with input data ($x_1$, $y_1$), as the front coordinates representative of a position where the user drew an image. The front coordinate transformation section 64 transforms the input data ($x_1$, $y_1$) supplied from the user interface 51 into the rear coordinates ($x_2$, $y_2$) and supplies them to a normalizing section 65 and the rear coordinate transformation section 63.

The normalizing section 65 transforms the rear coordinates ($x_2$, $y_2$) supplied from the front coordinate transformation section 64 into the normalized coordinates ($x_3$, $y_3$) and supplies them to a transmission section 66.

The transmission section 66 transmits drawing information containing the normalized coordinates ($x_3$, $y_3$) supplied from the front coordinate transformation section 64 to the drawing apparatus 54 via the network 3.

The drawing section 67 writes a predetermined value (draws an image) in a drawing memory 68 at a corresponding address, in accordance with the front coordinates ($x_1$, $y_1$) supplied from the rear coordinate transformation section 63.

The drawing memory 68 stores the predetermined value in response to the writing by the drawing section 67.

The display control section 69 displays the image corresponding to the stored value in the drawing memory 68 on the window 11A of the display 27A.

Since the content (an image corresponding to the written value) drawn relative to the drawing memory 68 by the drawing section 67 is displayed on the window 11A, it can be said that the drawing section 67 operates to draw an image on the screen of the display 27A.

Next, description will be made on front coordinates, rear coordinates, and normalized coordinates.

The front coordinates are the coordinates in a front coordinate system, and the rear coordinates are the coordinates in a rear coordinate system.

Figure 8:
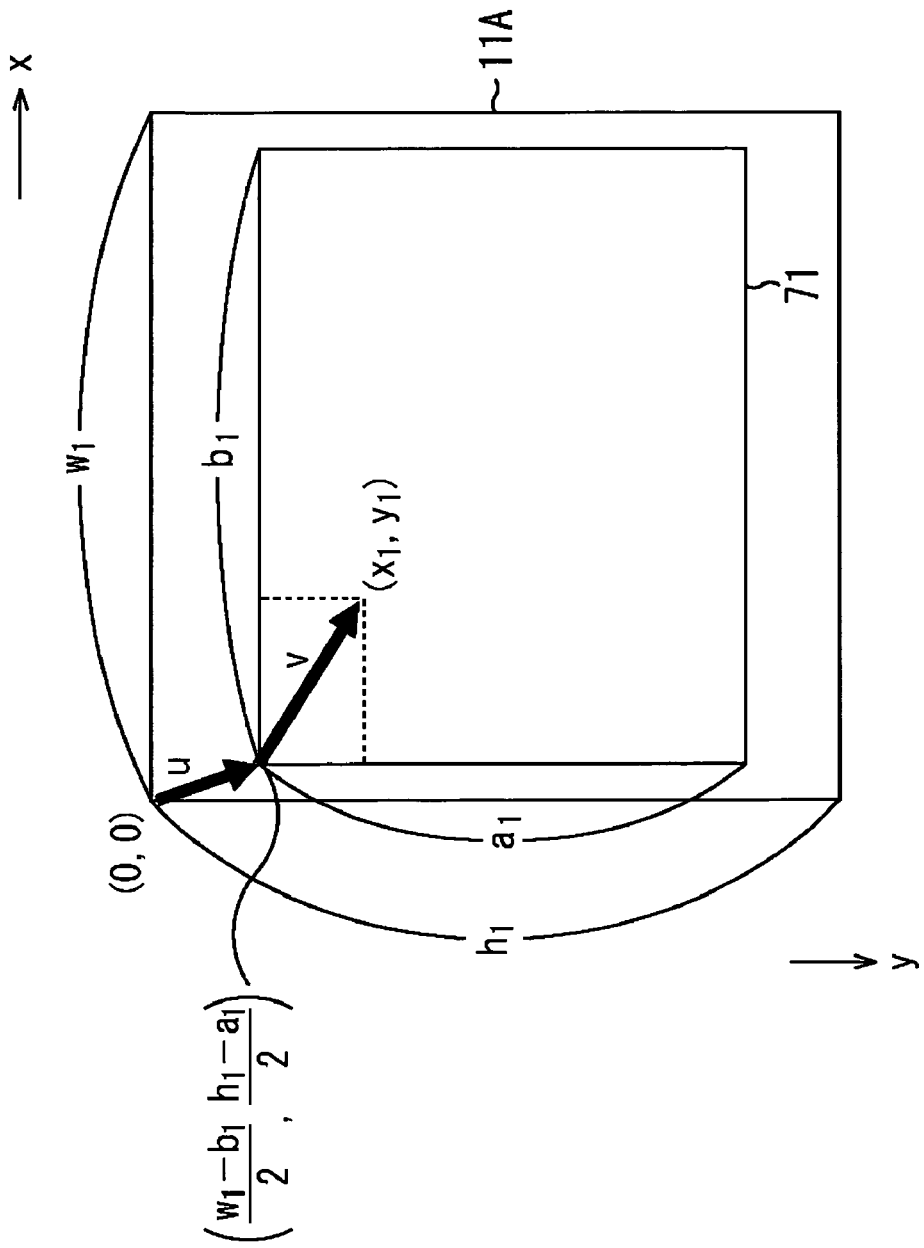
FIG. 8 is a diagram illustrating a front coordinate system.

FIG. 8 is a diagram illustrating the front coordinate system.

The front coordinate system is a coordinate system using as a reference the window 11A displayed on the computer 11 (window 12A displayed on the computer 12).

Namely, in FIG. 8, the front coordinate system uses the upper left corner of the window 11A (display area) as its origin (0, 0), a direction from left to right as an abscissa direction, and a direction from up to down as a ordinate direction.

In FIG. 8, the horizontal length (along the abscissa direction) of the display area of the window 11A is represented by w1 and the vertical length (along the ordinate direction) is represented by h1. This display area is an area where a user can draw an image, and its size changes as the window 11A is resized.

In FIG. 8, an image (moving image) 71 as the content is displayed in the window 11A. The image 71 is displayed by the image display section 52 (FIG. 5), and has a rectangle shape having a horizontal length of b1 and a vertical length of a1 as shown in FIG. 8. Namely, the aspect ratio (horizontal:vertical) of the image 71 is $b_1:a_1$. The aspect ratio $b_1:a_1$ of the image 71 depends on the function of the image display program 41 (FIG. 3) corresponding to the image display section 52 (56), and may change with a computer in some cases. It is herein assumed that the horizontal length b1 and vertical length a1 of the image 71 will not change even if the window 11A is resized. However, the horizontal length $b_1$ and vertical length $a_1$ of the image 71 may be changed so as to match resizing the window 11A, for example, while the aspect ratio $b_1:a_1$ is maintained.

The image 71 is displayed on the window 11A, for example, in such a manner that the center of gravity of the rectangle of the window 11A becomes coincident with the center of gravity of the rectangle of the image 71.

Therefore, the coordinates of the upper left corner of the image 71 is represented by the front coordinates (($w_1-b_1$)/2, ($h_1-a_1$)/2). A vector from the origin (0, 0) of the front coordinate system to the point (($w_1-b_1$)/2, ($h_1-a_1$)/2) is represented by a vector u. A vector from the upper left corner of the image 71 to a point ($x_1$, $y_1$) in the display area of the window 11A is represented by a vector v.

In this case, the vector v in the front coordinate system can be expressed by equation (1) by using the vector u.

$$v = \begin{pmatrix} x_1 \\ y_1 \end{pmatrix} - u = \begin{pmatrix} x_1 \\ y_1 \end{pmatrix} - \frac{1}{2}\begin{pmatrix} w_1 - b_1 \\ h_1 - a_1 \end{pmatrix} \qquad (1)$$

Figure 9:
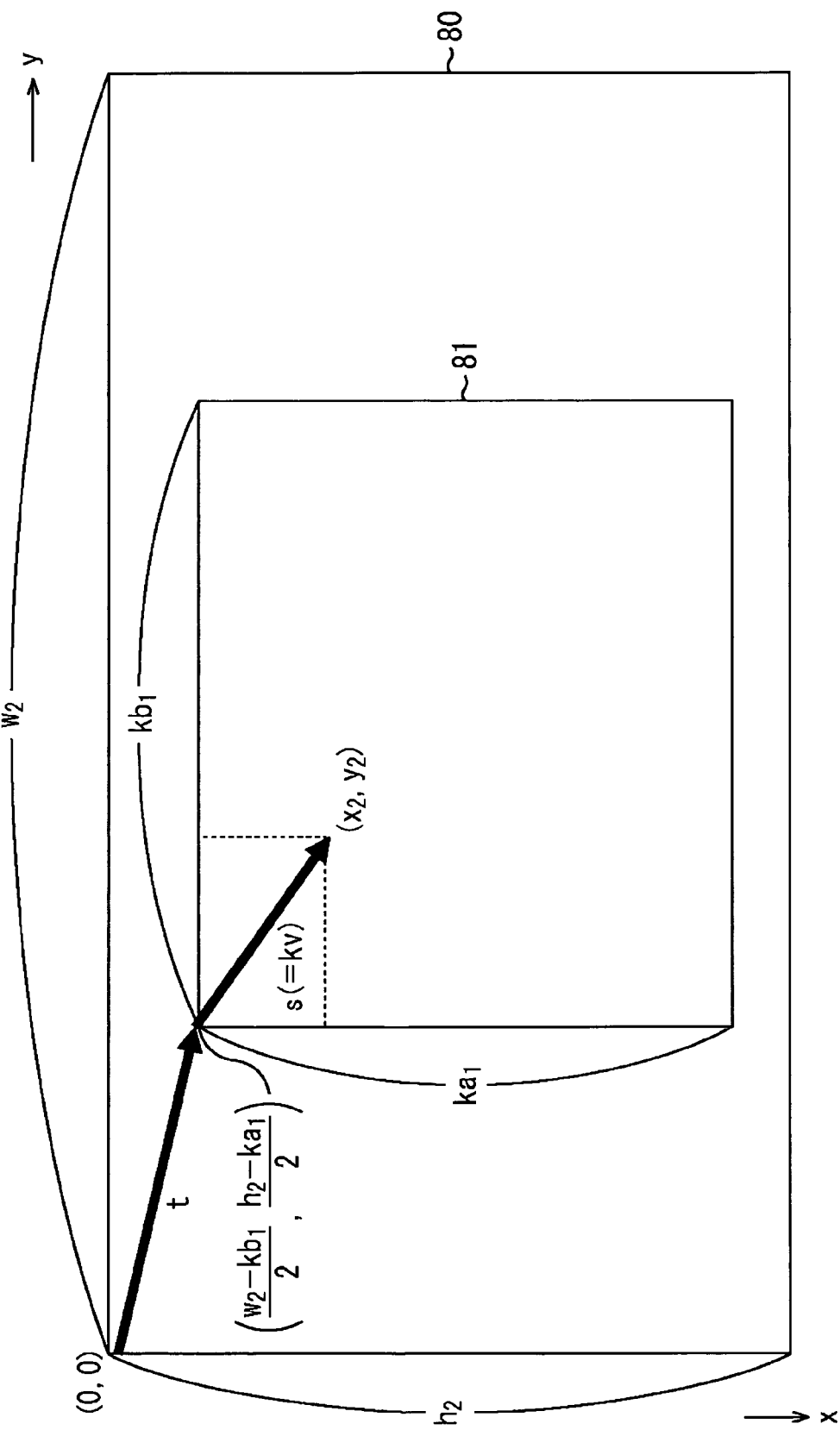
FIG. 9 is a diagram illustrating a rear coordinate system.

FIG. 9 is a diagram illustrating a rear coordinate system.

The rear coordinate system is a coordinate system using as a reference a rear screen 80.

Assuming that a user draws a point in the display area of the window 11A, the drawing sharing section 53 does not draw this point directly on the window 11A, but draws it once in a rear screen 80.

The rear screen 80 is a screen common to all the drawing apparatuses, and in the example shown in FIG. 9, has a rectangular shape having a horizontal length of $w_2$ and a vertical length of $h_2$. The entity of the rear screen 80 is a predetermined storage area of, for example, RAM 23 (FIG. 3).

In FIG. 9, the rear coordinate system is defined by using the upper left corner of the rear screen as an origin (0, 0), a direction from left to right as an abscissa direction and a direction from up to down as an ordinate direction.

In FIG. 9, a rear content screen (area) 81 is shown on the rear screen 80. The rear content screen 81 corresponds to the area where the image 71 of FIG. 8 is shown. The rear content screen 81 has a rectangle shape having a horizontal length of $kb_1$ and a vertical length of $ka_1$. Namely, the rear content screen 81 is a rectangle similar to the image at a similarity ratio of k. For example, the similarity ratio k may by 0.6.

In the rear screen 80, the rear content screen 81 is disposed, for example, in such a manner that the center of gravity of the rectangle of the rear screen 80 becomes coincident with the center of gravity of the rectangle of the rear content screen 81.

Therefore, the coordinates of the upper left corner of the rear content screen 81 are represented by $((w_2-kb_1)/2, (h_2-ka_1)/2)$ in the rear coordinate system. A vector from the origin (0, 0) of the rear screen 80 to the point $((w_2-kb_1)/2, (h_2-ka_1)/2)$ is represented by a vector t. A vector from the upper left corner of the rear content screen 81 to a point $(x_2, y_2)$ on the rear screen 80 corresponding to the point $(x_1, y_1)$ in FIG. 8 is represented by a vector s.

Since the point $(x_1, y_1)$ in FIG. 8 is in the image 71 and the rectangle of the image 71 and the rectangle of the rear content screen 81 are similar at the similarity ratio k, the vector s from the upper left corner of the rear content screen 81 to the point $(x_2, y_2)$ can be represented by a vector kv by using a vector v from the upper left corner of the image 71 of FIG. 8 to the point $(x_1, y_1)$.

The point $(x_2, y_2)$ in the rear coordinate system corresponding to the point $(x_1, y_1)$ in the front coordinate system is expressed by a sum t+kv of the vector t from the origin (0, 0) of the rear coordinate system to the upper left corner of the rear content screen 81 and the vector s (=kv) from the upper left corner of the rear content screen 81 to the point $(x_2, y_2)$. Therefore, the point $(x_2, y_2)$ in the rear coordinate system is expressed by the following equation (2) by using the vector v using the corresponding point $(x_1, y_1)$ in the front coordinate system.

$$\begin{pmatrix} x_2 \\ y_2 \end{pmatrix} = t + kv = \frac{1}{2}\begin{pmatrix} w_2 - kb_1 \\ h_2 - ka_1 \end{pmatrix} + k\begin{pmatrix} x_1 \\ y_1 \end{pmatrix} - \frac{k}{2}\begin{pmatrix} w_1 - b_1 \\ h_1 - a_1 \end{pmatrix} \quad (2)$$

Equation (2) is a function (mapping) f for transforming the point (front coordinates) $(x_1, y_1)$ in the front coordinate system into the corresponding point (rear coordinates) $(x_2, y_2)$ in the rear coordinate system.

Equation (2) is the function f for transforming the front coordinates $(x_1, y_1)$ into the rear coordinates $(x_2, y_2)$ in accordance with the aspect ratio of $b_1:a_1$ of the image 71 displayed on the computer 11, and the function f is described as a function $f_1$ in order to distinguish this function f from a function f for transforming the front coordinates into the rear coordinates in accordance with an aspect ratio of $b_2:a_2$ of an image displayed on the computer 12 to be described later.

The front coordinate transformation section 64 (FIG. 7) transforms the input data $(x_1, y_1)$ as a point in the front coordinate system into the point $(x_2, y_2)$ in the rear coordinate system, by using the function $f_1$ 63 of FIG. 7 transforms.

The rear coordinate transformation section the point $(x_2, y_2)$ in the rear coordinate system into the point $(x_1, y_1)$ in the front coordinate system, by using an inverse function $f_1^{-1}$ of the function $f_1$. Namely, the rear coordinate transformation section 63 transforms the rear coordinates $(x_2, y_2)$ into the front coordinates $(x_1, y_1)$ in accordance with the inverse function $f_1^{-1}$ represented by the following equation (3) obtained by solving equation (2) relative to $(x_1, y_1)$ $$\begin{pmatrix} x_1 \\ y_1 \end{pmatrix} = \frac{1}{2}\begin{pmatrix} w_1 - b_1 \\ h_1 - a_1 \end{pmatrix} + \frac{1}{k}\left\{\begin{pmatrix} x_2 \\ y_2 \end{pmatrix} - \frac{1}{2}\begin{pmatrix} w_2 - kb_1 \\ h_2 - ka_1 \end{pmatrix}\right\} \quad (3)$$

The values of $w_2$ and $h_2$ of the rear screen 80 of FIG. 9 are set so that a point in the front coordinate system corresponding to an optional point is positioned in a range of the rear screen 80, at least when the size of the window 11A (FIG. 8) is maximized.

The front and rear coordinate systems described above can be defined in a similar manner for the window 12A displayed on the computer 12.

FIG. 10 is a diagram illustrating the front coordinate system using as a reference the window 12A displayed on the computer 12.

In FIG. 10, similar to the case of FIG. 8, the front coordinate system is defined by using an upper left corner of the window 12A (in the display area) as an origin (0, 0), a direction from left to right as an abscissa direction and a direction from up to down as an ordinate direction.

In FIG. 10, a horizontal (along the abscissa direction) length of the display area of the window 12A is set to $w_3$ and the vertical (along the ordinate direction) length is set to $h_3$. This display area is also an area where a user can draw an image, and its size changes as the window 12A is resized.

In FIG. 10, an image (moving image) 121 as content is displayed in the window 12A. The image 121 is displayed by the image display section 56 (FIG. 5) and in the example shown in FIG. 10, has a rectangle shape having a horizontal length of $b_2$ and a vertical length of $a_2$. Namely, the aspect ratio (horizontal:vertical) of the image 121 is $b_2:a_2$.

The image display sections 52 and 56 of FIG. 5 display the same moving image as the image 71 (FIG. 8) and the image 121 on the windows 11A and 12A, respectively, at different aspect ratios if $b_1:a_1$ is different from $b_2:a_2$. If $b_1:a_1$ is not equal to $b_2:a_2$, it is assumed that $b_1<a_1$ and $b_2<a_2$ are satisfied or $b_1>a_1$ and $b_2>a_2$ are satisfied.

In the window 12A, the image 121 is displayed, for example, in such a manner that the center of gravity of the rectangle of the window 12A becomes coincident with the center of gravity of the rectangle of the image 121.

Therefore, the coordinates of the upper left corner of the image 121 are represented by $((w_3-b_2)/2, (h_3-a_2)/2)$ in the front coordinate system. A vector of the origin (0, 0) of the front coordinate system to the point $((w_3-b_2)/2, (h_3-a_2)/2)$ is represented by a vector u. A vector from the upper left corner of the image 121 to a point ($x_5$, $y_5$) in the display area of the window 12A is represented by a vector v.

In this case, the vector v in the front coordinate system is expressed by the following equation corresponding to equation (1), by using the vector u.

$$v = \begin{pmatrix} x_5 \\ y_5 \end{pmatrix} - u = \begin{pmatrix} x_5 \\ y_5 \end{pmatrix} - \frac{1}{2}\begin{pmatrix} w_3 - b_2 \\ h_3 - a_2 \end{pmatrix} \quad (4)$$

Similar to the drawing sharing section 53 described above, as a user draws a point in the display area of the window 12A, the drawing sharing section 57 of FIG. 5 does not draw the point on the window 12A directly, but draws it once on the rear screen.

FIG. 11 shows the rear screen 110 for the drawing sharing section 57.

In this embodiment, the rear screen 110 is common to (the same as) the rear screen 80 of FIG. 9, and as described with FIG. 9, has the rectangle shape having the horizontal length of $w_2$ and the vertical length $h_2$.

In FIG. 11, the rear coordinate system is defined by using the upper left corner of the rear screen 110 as an origin (0, 0), a direction from left to right as an abscissa direction and a direction from up to down as an ordinate direction.

Similar to the rear screen 80 of FIG. 9, a rear content screen (image) 111 is shown on the rear screen 110. The rear content screen 111 corresponds to the area where the image 121 of FIG. 10 is displayed. The rear content screen 111 has a rectangle shape having a horizontal length of $kb_2$ and a vertical length of $ka_2$. Namely, the rear content screen 111 has a rectangle shape similar to the image 121 at a similarity ratio of k. The similarity ratio can be, for example 0.6, as described earlier.

In the rear screen 110, similar to the rear content screen 81 of FIG. 9, the rear content screen 111 is disposed, for example, in such a manner that the center of gravity of the rectangle of the rear screen 110 becomes coincident with the center of gravity of the rectangle of the rear content screen 111.

Therefore, the coordinates of an upper left corner of the rear content screen 111 are represented by (($w_2$–$kb_2$)/2, ($h_2$–$ka_2$)/2) in the rear coordinate system. A vector from an origin (0, 0) of the rear screen 110 to the point (($w_2$–$kb_2$)/2, ($h_2$–$ka_2$)/2) is represented by a vector t. A vector from the upper left corner of the rear content screen 111 to a point ($x_4$, $y_4$) on the rear screen 110 corresponding to the point ($x_5$, $y_5$) of FIG. 5 is represented by a vector s.

Since the point ($x_5$, $y_5$) in FIG. 10 is in the image 121 and the rectangle of the image 121 and the rectangle of the rear content screen 111 are similar at the similarity ratio k, the vector s from the upper left corner of the rear content screen 111 to the point ($x_4$, $y_4$) can be represented by a vector kv by using a vector v from the upper left corner of the image 121 of FIG. 10 to the point ($x_5$, $y_5$).

The point ($x_4$, $y_4$) in the rear coordinate system corresponding to the point ($x_5$, $y_5$) in the front coordinate system is expressed by a sum t+kv of the vector t and the vector s (=kv). Therefore, the point ($x_4$, $y_4$) in the rear coordinate system is expressed by the following equation (5) corresponding to equation (2) by using the vector v using the corresponding point ($x_5$, $y_5$) in the front coordinate system.

$$\begin{pmatrix} x_4 \\ y_4 \end{pmatrix} = t + kv = \frac{1}{2}\begin{pmatrix} w_2 - kb_2 \\ h_2 - ka_2 \end{pmatrix} + k\begin{pmatrix} x_5 \\ y_5 \end{pmatrix} - \frac{k}{2}\begin{pmatrix} w_3 - b_2 \\ h_3 - a_2 \end{pmatrix} \quad (5)$$

Similar to equation (2), equation (5) is a function (mapping) f for transforming the front coordinates ($x_5$, $y_5$) in the front coordinate system into the corresponding rear coordinates ($x_4$, $y_4$) in the rear coordinate system.

Equation (5) is the function f for transforming the front coordinates into the rear coordinates in accordance with the aspect ratio of $b_2$:$a_2$ of the image 121 displayed on the computer 12, and the function f is described as a function $f_2$ in order to distinguish this function f from the function $f_1$ of equation (2) for transforming the front coordinates into the rear coordinates in accordance with the aspect ratio of $b_1$:$a_1$ of the image 71 displayed on the computer 11.

The rear coordinates ($x_4$, $y_4$) can be transformed into the front coordinates ($x_5$, $y_5$) by using an inverse function $f_{2-1}$ of the function $f_2$ of equation (5), i.e., the inverse function $f^{2-1}$ expressed by the following equation (6) obtained by solving equation (5) relative to the front coordinates ($x_5$, $y_5$).

$$\begin{pmatrix} x_5 \\ y_5 \end{pmatrix} = \frac{1}{2}\begin{pmatrix} w_3 - b_2 \\ h_3 - a_2 \end{pmatrix} + \frac{1}{k}\left\{\begin{pmatrix} x_4 \\ y_4 \end{pmatrix} - \frac{1}{2}\begin{pmatrix} w_2 - kb_2 \\ h_2 - ka_2 \end{pmatrix}\right\} \quad (6)$$

The image 71 shown in FIG. 8 is, as described above, similar to the rear content screen 81 corresponding to the image 71 and shown in FIG. 9, and the rear content screen 81 maintains the aspect ratio of $b_1$:$a_1$ of the image 71. The function $f_1$ of equation (2) for transforming the front coordinates ($x_1$, $y_1$) into the rear coordinates ($x_2$, $y_2$) for the computer 11 (drawing apparatus 50) transforms therefore the front coordinates ($x_1$, $y_1$) into the rear coordinates ($x_2$, $y_2$) by maintaining the aspect ratio of b1:a1 of the image 71 (FIG. 8) displayed on the window 11A. It can therefore be said that the function $f_1$ of equation (2) (also the inverse function $f_1^{-1}$ of equation (3)) is in a sense a function corresponding to the aspect ratio of $b_1$:$a_1$ of the image 71.

From the same reason, the function f2 of equation (5) transforms the front coordinates ($x_5$, $y_5$) into the rear coordinates ($x_4$, $y_4$) by maintaining the aspect ratio of $b_2$:$a_2$ of the image 121 (FIG. 10) displayed on the window 12A. It can therefore be said that the function $f_2$ of equation (5) (also the inverse function $f_2^{-1}$ of equation (6)) is in a sense a function corresponding to the aspect ratio of $b_2$:$a_2$ of the image 121.

Assuming now that in FIG. 5 synchronous images are drawn on the windows 11A and 12A by exchanging the rear coordinates ($x_2$, $y_2$) (($x_4$, $y_4$)) between the drawing apparatuses 50 and 54, for example as a user of the drawing apparatus 50 draws a point represented by the front coordinates ($x_1$, $y_1$) on the window 11A, the drawing apparatus 50 transforms the front coordinates ($x_1$, $y_1$) into the rear coordinates ($x_2$, $y_2$) by using the function $f_1$ of equation (2) and transmits the rear coordinates to the drawing apparatus 54.

The drawing apparatus 54 receives the rear coordinates ($x_2$, $y_2$) from the drawing apparatus 50 and transforms the rear coordinates into the front coordinates ($x_5$, $y_5$) by the inverse function $f_1^{-1}$ of equation (6), by using the rear coordinates ($x_2$, $y_2$) as the rear coordinates ($x_4$, $y_4$) of equation (6). The drawing apparatus 54 draws (displays) the point on the window 12A at the position represented by the front coordinates ($x_5$, $y_5$).

The rear coordinates $(x_2, y_2)$ transmitted from the drawing apparatus 50 to the drawing apparatus 54 are the same as the rear coordinates $(x_4, y_4)$ received by the drawing apparatus 54 from the drawing apparatus 50 and transformed into the front coordinates $(x_5, y_5)$ by the inverse function $f_2^{-1}$ of equation (6). Namely, the rear coordinates $(x_2, y_2)$ on the rear screen 80 (FIG. 9) transmitted from the drawing apparatus 50 to the drawing apparatus 54 are the same as the rear coordinates $(x_4, y_4)$ on the rear screen 110 (FIG. 11) received by the drawing apparatus 54 from the drawing apparatus 50 and transformed into the front coordinates $(X_5, y_5)$ by the inverse function $f_1^{-1}$ of equation (6).

However, the rear coordinates $(x_2, y_2)$ are the coordinates obtained by the drawing apparatus 50 by transforming the front coordinates $(x_1, y_1)$ by the function $f_1$ of equation (2) corresponding to the aspect ratio of $b_1:a_1$ of the image 71. Further, the rear coordinates $(x_4, y_4)$ same as the rear coordinates $(x_2, y_2)$ are transformed into the front coordinates $(x_5, y_5)$ by the drawing apparatus 54 by using the inverse function $f_1^{-1}$ of equation (6) corresponding to the aspect ratio of $b_2:a_2$ of the image 121.

Therefore, if the aspect ratio of $b_1:a_1$ of the image 71 displayed by the drawing apparatus 50 is different from the aspect ratio of $b_2:a_2$ of the image 121 displayed by the drawing apparatus 54, the front coordinates $(x_1, y_1)$ at the drawing apparatus 50 are not coincident with the front coordinates $(x_5, y_5)$ at the drawing apparatus 54, so that there is a position displacement between the point drawn by the user at the drawing apparatus 50 and the point drawn by the drawing apparatus 54.

To avoid the above-described position displacement, the drawing apparatuses 50 and 54 (drawing sharing sections 53 and 57) of FIG. 5 each transform the rear coordinates by a function g for normalizing the aspect ratio of an image to be displayed on the display 27A (windows 11A and 12A) and transmit/receive the transformed coordinates.

The coordinates obtained by transforming the rear coordinates by the function g for normalizing the aspect ratio of an image, is herein called normalized coordinates.

The normalized coordinates are coordinates in a normalized coordinate system, and the normalized coordinate system is a coordinate system using as a reference a virtual normalized screen.

Figure 13:
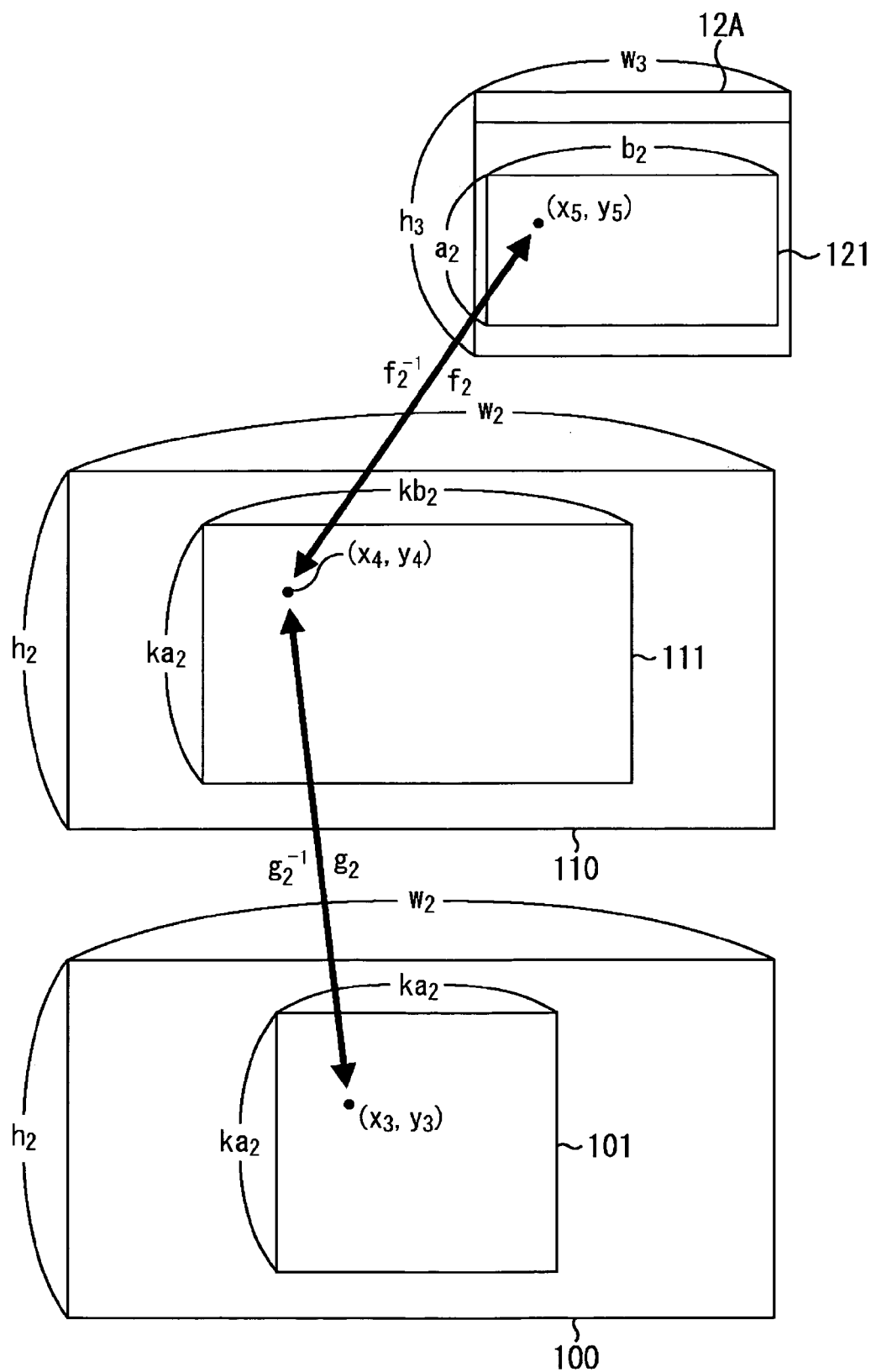
FIG. 13 is a diagram illustrating a normalized coordinate system.

FIGS. 12 and 13 are diagrams illustrating the normalized coordinate system.

FIG. 12 shows the window 11A, the rear screen 80 and a normalized screen 90 respectively displayed by the drawing apparatus 50 (drawing sharing section 53), and FIG. 13 shows the window 12A, the rear screen 110 and a normalized screen 100 respectively displayed by the drawing apparatus 54 (drawing sharing section 57).

Since the window 11A and rear screen 80 in FIG. 12 are similar to the window 11A shown in FIG. 8 and the rear screen 80 shown in FIG. 9, the description thereof is omitted. Since the window 12A and rear screen 110 in FIG. 13 are also similar to the window 12A shown in FIG. 10 and the rear screen 110 shown in FIG. 11, the description thereof is omitted.

As shown in FIG. 12, in the drawing sharing section 53 of the drawing apparatus 50, as a user draws an image on the window 11A at the front coordinates $(x_1, y_1)$, the front coordinates $(x_1, y_1)$ are transformed into the rear coordinates $(x_2, y_2)$ by the function $f_1$ of equation (1). Further, in the drawing apparatus 50, the rear coordinates $(x_2, y_2)$ are transformed into the normalized coordinates $(x_3, y_3)$ in the normalized coordinate system by a function $g_1$ for normalizing the aspect ratio of the image 71 to be displayed by the drawing apparatus 50, and the normalized coordinates are transmitted to the drawing apparatus 54.

In the drawing apparatus 50, as shown in FIG. 12, the normalized coordinate system is a coordinate system using as a reference the virtual normalized screen 90.

In FIG. 12, the normalized screen 90 has, for example, the same rectangle shape as the rear screen 80, i.e., the rectangle shape having the horizontal length of $w_2$ and the vertical length of $h_2$. The normalized screen 90 may be different from the rear screen 80.

In FIG. 12, the normalized coordinate system is defined by using an upper left corner of the normalized screen 90 as an origin (0, 0), a direction from left to right as an abscissa direction and a direction from up to down as an ordinate direction.

In FIG. 12, a normalized content screen (area) 91 is shown on the normalized screen 90. The normalized content screen 91 is a region having the same horizontal and vertical length and obtained by normalizing, for example, at an aspect ratio of 1:1 the aspect ratio $b_1:a_1$ of the area (rear content screen 81 of the rear screen 80) where the image 71 on the window 11A is displayed.

Namely, in FIG. 12 the normalized content screen 91 has, for example, a square shape having the vertical length of ka1 same as that of the rear content screen 81 and the horizontal length of $ka_1$. The aspect ratio of the normalized content screen 91 is therefore 1:1. However, the aspect ratio of the normalized content screen 91 is not limited to 1:1 (also for a normalized content screen 100 to be described later).

In the normalized screen 90, the normalized content screen 91 is disposed, for example, in such a manner that the center of gravity of the rectangle of the normalized screen 90 becomes coincident with the center of gravity of the square of the normalized content screen 91.

In FIG. 12, the vertical length ka1 of the normalize content screen 91 is the same as the vertical length $ka_1$ of the rear content screen 81, and the horizontal length $ka_1$ of the normalized content screen 91 is different from the horizontal length $kb_1$ of the rear content screen 81. Therefore, the rear coordinates $(x_2, y_2)$ on the center line equally dividing the rear content screen 81 into right and left halves are coincident with the normalized coordinates $(x_3, y_3)$ on the center line equally dividing the normalized content screen 91 into right and left haves.

The right or left area obtained by dividing the rear content screen 81 at the center line into right and left halves corresponds to the right or left area obtained by dividing the normalized content screen 91 at the center line into right and left halves. It is therefore necessary to transform a point in the left area of the rear content screen 81 into a point in the left area of the normalized content screen 91, and to transform a point in the right area of the rear content screen 81 into a point in the right area of the normalized content screen 91.

In FIG. 12, the normalized content screen 91 has the vertical length of $ka_1$ same as the vertical length of $ka_1$ of the rear content screen 81, and the horizontal length of $ka_1$ is different from the horizontal length of $kb_1$ of the rear content screen 81. The normalized content screen 91 has therefore an area obtained by expanding/compressing the rear content screen 81 in the horizontal direction.

In order to transform the point $(x_2, y_2)$ in the right or left area of the rear content screen 81 into the point $(x_3, y_3)$ in the right or left area of the normalized content screen 91, by maintaining the y coordinates as they are, the x coordinates are moved (expanded/compressed) in accordance with the ratio $b_1:a_1$ of the x-direction lengths (horizontal lengths) of the rear content screen 81 and normalized content screen.

Namely, the point (rear coordinates) $(x_2, y_2)$ on the rear screen 80 can be transformed into the point (normalized coordinates) $(x_3, y_3)$ on the normalized screen 90 by the function g1 of the following equation (7).

$$\begin{pmatrix} x_3 \\ y_3 \end{pmatrix} = \begin{pmatrix} \frac{w_2}{2} - \left(\frac{w_2}{2} - x_2\right) \times \frac{a_1}{b_1} \\ y_2 \end{pmatrix} \quad (7)$$

The normalized coordinates $(x_3, y_3)$ on the normalized screen 90 can be transformed into the rear coordinates $(x_2, y_2)$ on the rear screen 80 by an inverse function $g_1^{-1}$ obtained by solving equation (7) relative to $(x_2, y_2)$, i.e., the following equation (8).

$$\begin{pmatrix} x_2 \\ y_2 \end{pmatrix} = \begin{pmatrix} \frac{w_2}{2} - \left(\frac{w_2}{2} - x_3\right) \times \frac{b_1}{a_1} \\ y_3 \end{pmatrix} \quad (8)$$

Similar to the drawing sharing section 53 of the drawing apparatus 50, as shown in FIG. 13, in the drawing sharing section 57 of the drawing apparatus 54, as a user draws an image on the window 11A at the front coordinates $(x_5, y_5)$, the front coordinates $(x_5, y_5)$ are transformed into the rear coordinates $(x_4, y_4)$ by the function $f_2$ of equation (5). Further, in the drawing apparatus 54, the rear coordinates $(x_4, y_4)$ are transformed into the normalized coordinates $(x_3, y_3)$ in the normalized coordinate system by a function $g_2$ for normalizing the aspect ratio of the image 121 to be displayed by the drawing apparatus 54, and the normalized coordinates are transmitted to the drawing apparatus 50.

In the drawing apparatus 54, as shown in FIG. 13, the normalized coordinate system is a coordinate system using as a reference the virtual normalized screen 100.

In FIG. 13, the normalized screen 100 has the same rectangle shape as the rear screen 110, for example, i.e., the rectangle shape having the horizontal length of $w_2$ and the vertical length of $h_2$. The normalized screen 100 may be different from the rear screen 110.

In FIG. 13, the normalized coordinate system is defined by using an upper left corner of the normalized screen 100 as an origin (0, 0), a direction from left to right as an abscissa direction and a direction from up to down as an ordinate direction.

In FIG. 13, a normalized content screen (area) 101 is shown on the normalized screen 100. Similar to FIG. 12, the normalized content screen 101 is a region having the same horizontal and vertical length and obtained by normalizing at an aspect ratio of 1:1 the aspect ratio $b_2:a_2$ of the area (rear content screen 111 of the rear screen 110) where the image 121 on the window 12A is displayed.

Namely, in FIG. 13 the normalized content screen 101 has, for example, a square shape having the vertical length of $ka_2$ same as that of the rear content screen 111 and the horizontal length of $ka_2$. The aspect ratio of the normalized content screen 101 is therefore 1:1.

In the normalized screen 100, the normalized content screen 101 is disposed, for example, in such a manner that the center of gravity of the rectangle of the normalized screen 100 becomes coincident with the center of gravity of the square of the normalized content screen 101.

The vertical length $ka_2$ of the normalized content screen 101 is the same as the vertical length $ka_2$ of the rear content screen 111, and the horizontal length $ka_2$ is different from the horizontal length $kb_2$ of the rear content screen 111. Therefore, similar to the normalized content screen 91 shown in FIG. 12, the normalized content screen 101 has also an area obtained by expanding/compressing the rear content screen 111 in the horizontal direction.

The point (rear coordinates) $(x_4, y_4)$ on the rear screen 110 can be transformed into the point (normalized coordinates) $(x_3, y_3)$ on the normalized screen 100 by a function $g_2$ of the following equation (9) derived in a manner similar to equation (7).

$$\begin{pmatrix} x_3 \\ y_3 \end{pmatrix} = \begin{pmatrix} \frac{w_2}{2} - \left(\frac{w_2}{2} - x_4\right) \times \frac{a_2}{b_2} \\ y_4 \end{pmatrix} \quad (9)$$

The normalized coordinates $(x_3, y_3)$ on the normalized screen 100 can be transformed into the rear coordinates $(x_4, y_4)$ on the rear screen 110 by an inverse function $g_2^{-1}$ obtained by solving equation (9) relative to $(x_4, y_4)$, i.e., the following equation (10).

$$\begin{pmatrix} x_4 \\ y_4 \end{pmatrix} = \begin{pmatrix} \frac{w_2}{2} - \left(\frac{w_2}{2} - x_3\right) \times \frac{b_2}{a_2} \\ y_3 \end{pmatrix} \quad (10)$$

The drawing apparatuses 50 and 54 draw an image without position displacement by exchanging the above-described normalized coordinates $(x_3, y_3)$.

FIG. 14 is a diagram illustrating the process to be executed by the drawing sharing section 53 of the drawing apparatus 50 and the drawing sharing section 57 of the drawing apparatus 54 respectively of FIG. 5.

In FIG. 14, for the purposes of description simplicity, the vertical length $ka_1$ of the rear content screen 81 on the rear screen 80 is set equal to the vertical length $ka_2$ of the rear content screen 111 on the rear screen 110. Therefore, in FIG. 14, the normalized content screen 91 corresponding to the rear content screen 81 is the same as the normalized content screen 101 corresponding to the rear content screen 111.

For example, at the drawing apparatus 50 as the user draws an image on the window 11A at the point indicated by the front coordinates $(x_1, y_1)$, the drawing sharing section 53 transforms the front coordinates $(x_1, y_1)$ into the rear coordinates $(x_2, y_2)$ by the function f1 of equation (2). Then, the drawing sharing section 53 transforms the rear coordinates $(x_2, y_2)$ into the normalized coordinates $(x_3, y_3)$ by the function $g_1$ of equation (7) and transmits the drawing information containing the normalized coordinates $(x_3, y_3)$ to the drawing apparatus 54.

The drawing sharing section 57 of the drawing apparatus 54 receives the drawing information from the drawing sharing section 53 and transforms the normalized coordinates $(x_3, y_3)$ contained in the drawing information into the rear coordinates $(x_4, y_4)$ by the inverse function $g_2^{-1}$ of equation (10). Then, the drawing sharing section 57 transforms the rear coordinates $(x_4, y_4)$ into the front coordinates $(x_5, y_5)$ by the inverse function $f_2^{-1}$ of equation (6) and draws a point on the window 12A at the position indicated by the front coordinates $(x_5, y_5)$.

On other hand, for example, at the drawing apparatus 54 as the user draws an image on the window 12A at the point indicated by the front coordinates ($x_5$, $y_5$), the drawing sharing section 57 transforms the front coordinates ($x_5$, $y_5$) into the rear coordinates ($x_4$, $y_4$) by the function $f_2$ of equation (5). Then, the drawing sharing section 57 transforms the rear coordinates ($x_4$, $y_4$) into the rear normalized coordinates ($x_3$, $y_3$) by the function $g_2$ of equation (9) and transmits the drawing information containing the normalized coordinates ($x_3$, $y_3$) to the drawing apparatus 50.

The drawing sharing section 53 of the drawing apparatus 50 receives the drawing information from the drawing sharing section 57 and transforms the normalized coordinates ($x_3$, $y_3$) contained in the drawing information into the rear coordinates ($x_2$, $y_2$) by the inverse function $g_1^{-1}$ of equation (8). Then, the drawing sharing section 53 transforms the rear coordinates ($x_2$, $y_2$) into the front coordinates ($x_1$, $y_1$) by the inverse function $f_1^{-1}$ of equation (3) and draws a point on the window 11A at the position indicated by the front coordinates ($x_1$, $y_1$).

Next, with reference to the flow chart of FIG. 15, description will be made on the process to be executed by the drawing sharing section 53 of FIG. 7 to transmit drawing information to the drawing apparatus 54.

Figure 15:
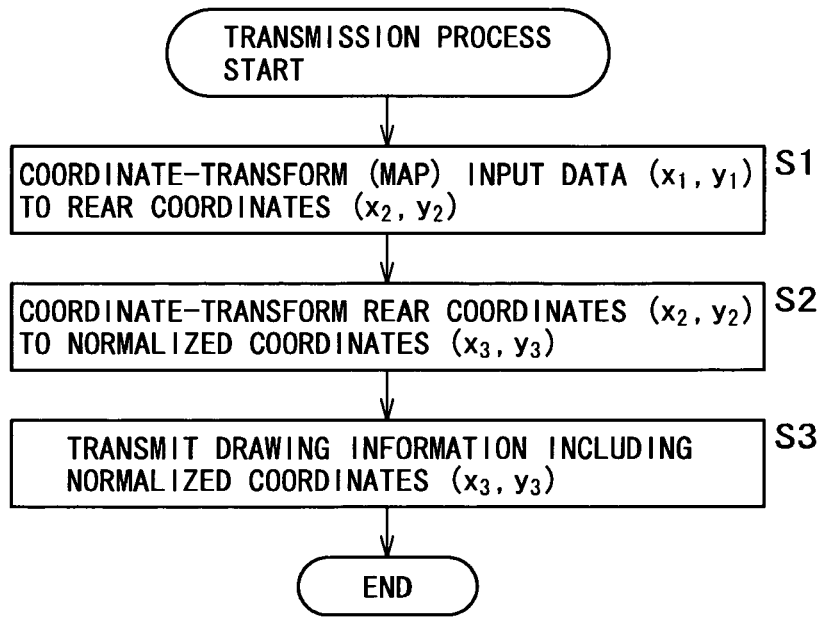
FIG. 15 is a flow chart illustrating the process to be executed by the drawing sharing section 53.

The process of FIG. 15 starts when the input data (coordinates) ($x_1$, $y_1$) representative of the position in the front coordinate system where the image was drawn is supplied from the user interface 51, in response to that the user of the drawing apparatus 50 (computer 11) draws some image on the window 11A.

At Step S1, the front coordinate transformation section 64 coordinate-transforms the input data ($x_1$, $y_1$) supplied from the user interface 51 into the rear coordinates ($x_2$, $y_2$) by the function f1 corresponding to the aspect ratio $b_1:a_1$ of the image 71 displayed on the window 11A, i.e., equation (2), and supplies the rear coordinates to the rear coordinate transformation section 63 and normalizing section 65 to thereafter advance to Step S2.

As the rear coordinates ($x_2$, $y_2$) are supplied from the front coordinate transformation section 64, the rear coordinate transformation section 63 coordinate-transforms the rear coordinates ($x_2$, $y_2$) into the front coordinates ($x_1$, $y_1$) by the inverse function $f_1^{-1}$ of the function $f_1$, i.e., equation (3), and supplies the front coordinates to the drawing section 67. In accordance with the front coordinates ($x_1$, $y_1$) supplied from the rear coordinate transformation section 63, the drawing section 67 writes (draws) a predetermined value in the drawing memory 68 at a corresponding address. The display control section 69 displays an image corresponding to the stored value in the drawing memory 68 on the window 11A of the display 27A (FIG. 3). In this manner, the point corresponding to the input data ($x_1$, $y_1$) is displayed on the window 11A.

In this case, the front coordinates ($x_1$, $y_1$) obtained at the rear coordinate transformation section 63 are the same as the input data ($x_1$, $y_1$).

At Step S2, the normalizing section 65 coordinate-transforms the rear coordinates ($x_2$, $y_2$) supplied from the front coordinate transformation section 64 into the normalized coordinates ($x_3$, $y_3$) by the function $g_1$ for normalizing the aspect ratio of $b_1:a_1$ of the image 71 displayed on the window 11A, i.e., equation (7), and transmits the normalized coordinates to the transmission section 66 to thereafter advance to Step S3.

At Step S3, the transmission section 66 transmits the drawing information containing the normalized coordinates ($x_3$, $y_3$) supplied from the normalizing section 65 to the drawing apparatus 54 (drawing sharing section 57) (FIG. 5) via the network 3 to thereafter terminate the process.

The process conforming to the flow chart of FIG. 15 is also executed by the drawing sharing section 57 of the drawing apparatus 54, in addition to the drawing sharing section 53.

Figure 16:
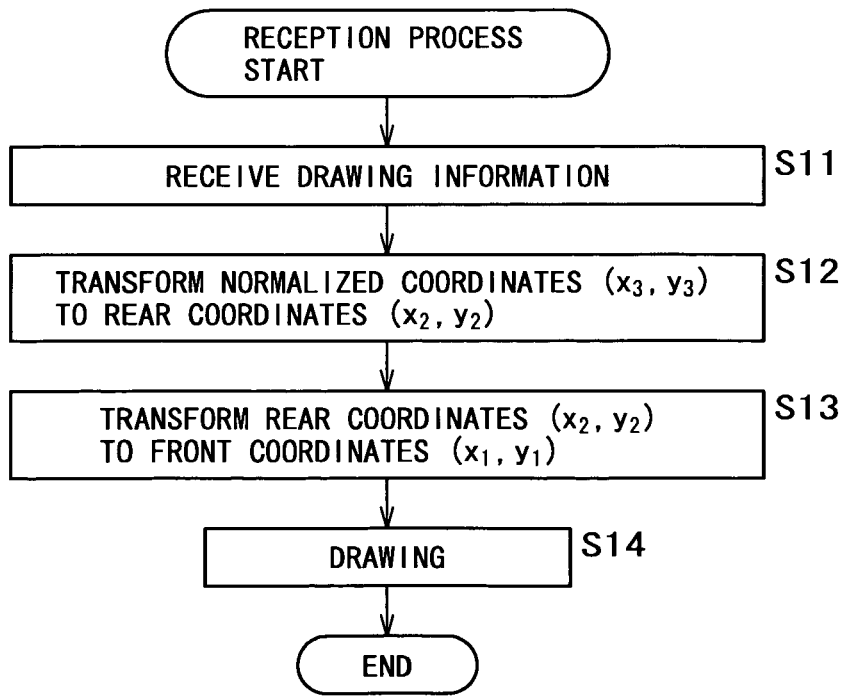
FIG. 16 is a flow chart illustrating the process to be executed by the drawing sharing section 53.

Next, with reference to the flow chart of FIG. 16, description will be made on the process to be executed by the drawing sharing section 53 of FIG. 7 in accordance with the drawing information transmitted from the drawing sharing section 57 of the drawing apparatus 54.

As the drawing information is transmitted from the drawing sharing section 57 of the drawing apparatus 54 via the network 3, at Step S11 the reception section 61 receives the drawing information and supplies the normalized coordinates ($x_3$, $y_3$) contained in the drawing information to the normalized coordinate transformation section 62 to thereafter advance to Step S12.

Namely, since the drawing sharing section 57 of the drawing apparatus 54 executes a process similar to that described with FIG. 15 and transmits the drawing information containing the normalized coordinates ($x_3$, $y_3$) corresponding to the drawing made by the user of the drawing apparatus 54 (computer 12), at Step S11 the reception section 61 receives the drawing information transmitted in this manner.

At Step S12 the normalized coordinate transformation section 62 coordinate-transforms the normalized coordinates ($x_3$, $y_3$) from the reception section 61 into the rear coordinates ($x_2$, $y_2$) by the inverse function $g_1^{-1}$ of the function $g_1$ for normalizing the aspect ratio of $b_1:a_1$ of the image 71 displayed on the window 11A, i.e., equation (8), and supplies the rear coordinates to the rear coordinate transformation section 63 to thereafter advance to Step S13.

At Step S13, the rear coordinate transformation section 63 coordinate-transforms the rear coordinates ($x_2$, $y_2$) from the normalized coordinate transformation section 62 into the front coordinates ($x_1$, $y_1$) by the inverse function $f_1^{-1}$ of the function $f_1$, i.e., equation (3), and supplies the front coordinates to the drawing section 67 to thereafter advance to Step S14.

At Step S14, in accordance with the front coordinates ($x_1$, $y_1$) supplied from the rear coordinate transformation section 63, the drawing section 67 writes (draws) a predetermined value in the drawing memory 68 at a corresponding address. The display control section 69 displays the image corresponding to the stored value in the drawing memory 68 on the window 11A of the display 27A (FIG. 3) to thereafter terminate the process.

As described above, in the drawing apparatus 50, the normalized coordinates ($x_3$, $y_3$) transmitted from the drawing apparatus 54 via the network 3 is transformed into the rear coordinates ($x_2$, $y_2$) by the inverse function $g_1^{-1}$ of the function $g_1$ for normalizing the aspect ratio of $b_1:a_1$ of the image 71 displayed on the display 27A, the rear coordinates ($x_2$, $y_2$) are transformed into the front coordinates ($x_1$, $y_1$) by the inverse function $f_1^{-1}$ of the function $f_1$ corresponding to the aspect ratio $b_1:a_1$ of the image 71 and being different from the function $g_1$, and an image is drawn on the screen of the display 27A in accordance with the front coordinates ($x_1$, $y_1$). Accordingly, accurate drawing without position displacement can be performed irrespective of different aspect ratios of the drawing apparatus 54 on the transmission side of drawing information and the drawing apparatus 50 on the reception side.

In the drawing apparatus 50, the front coordinates ($x_1$, $y_1$) as the input data representative of the position of the drawing made by the user is transformed into the rear coordinates ($x_2$, $y_2$) by the function $f_1$ corresponding to the aspect ratio of $b_1$:$a_1$ and being different from the function g1 for normalizing the aspect ratio of $b_1$:$a_1$ of the image 71 displayed on the display 27A, the rear coordinates ($x_2$, $y_2$) are transformed into the normalized coordinates ($x_3$, $y_3$) by the function $g_1$, and the normalized coordinates ($x_3$, $y_3$) are transmitted to the drawing apparatus 54 via the network 3. Accordingly, accurate drawing without position displacement is possible also in the case that the drawing apparatus 50 becomes the transmission side of drawing information and the drawing apparatus 54 becomes the reception side.

Therefore, the users of the drawing apparatuses 50 and 54 can have comfortable information sharing (mutual understanding).

In this embodiment, in the drawing apparatus 50, the input data ($x_1$, $y_1$) drawn by a user is once coordinate-transformed into the rear coordinates ($x_2$, $y_2$) and thereafter further coordinate-transformed into the front coordinates ($x_1$, $y_1$), and the drawing section 67 draws an image in accordance with the front coordinates ($x_1$, $y_1$). Instead, the drawing section 67 may draw an image directly in accordance with the input data ($x_1$, $y_1$).

Further, in this embodiment although two users of the drawing apparatuses 50 and 54 share drawing information via the network 3, drawing information may be shared by three or more users via the network.

Furthermore, the transmission methods of transmitting drawing information via the network 3 to be shared by a plurality of users may be a so-called bucket relay method, for example, wherein drawing information is sequentially transmitted from one user to another repetitively or a method wherein a computer of one user operates as a server, and this server transfers drawing information to and from client computers of other users.

Still further, in the examples of preferred embodiments present herein, although the rear screens 80 and 110 have a common size (same size), the rear screens 80 and 110 may have different sizes. This also applies to the normalized screens 90 and 100.

What is claimed is:

1. A drawing apparatus for performing drawing on a screen of a display apparatus in response to position information transmitted from another apparatus and indicating a position on which drawing is performed, the apparatus comprising:

means for enabling a change in aspect ratio;

first transforming mechanism for transforming the position information into first transformed position information in accordance with an inverse function of a first function for normalizing an aspect ratio of an image displayed on the display apparatus which has been changed by the means for enabling;

second transforming mechanism for transforming the first transformed position information into second transformed position information in accordance with an inverse function of a second function, different from the first function, corresponding to the aspect ratio of the image; and drawing mechanism for drawing an image on the screen of the display apparatus.

2. The drawing apparatus according to claim 1, further comprising:

third transforming mechanism for transforming drawing input position information, representative of a position of a drawing input over the screen, into third transformed position information based on the second function;

fourth transforming mechanism for transforming the third transformed position information into fourth transformed position information based on the first function; and transmitter for transmitting the fourth transformed position information to the other apparatus via a network.

3. A drawing method for performing drawing on a screen of a display apparatus in response to position information transmitted from another apparatus and indicating a position on which drawing is performed, the method comprising:

a step of enabling a change in aspect ratio;

a first step of transforming the position information into first transformed position information in accordance with an inverse function of a first function for normalizing an aspect ratio of an image displayed on the display apparatus which has been changed;

a second step of transforming the first transformed position information into second transformed position information in accordance with an inverse function of a second function, different from the first function, corresponding to the aspect ratio of the image; and a drawing step of drawing an image on the screen of the display apparatus.

4. A computer-readable program to be encoded in computer-readable medium, said program for causing a computer to execute the steps of a method for performing drawing on a screen of a display apparatus in response to position information transmitted from another apparatus and indicating a position on which drawing is performed, the method comprising:

a step of enabling a change in aspect ratio;

a first step of transforming the position information into first transformed position information in accordance with an inverse function of a first function for normalizing an aspect ratio of an image displayed on the display apparatus which has been changed;

a second step of transforming the first transformed position information into second transformed position information in accordance with an inverse function of a second function, different from the first function, corresponding to the aspect ratio of the image; and a drawing step of drawing an image on the screen of the display apparatus.

5. A recording medium having recorded thereon a computer-readable program for causing a computer to perform the steps of a method for performing drawing on a screen of a display apparatus in response to position information transmitted from another apparatus and indicating a position on which drawing is performed, the method comprising:

a step of enabling a change in aspect ratio;

a first step of transforming the position information into first transformed position information in accordance with an inverse function of a first function for normalizing an aspect ratio of an image displayed on the display apparatus which has been changed;

a second step of transforming the first transformed position information into second transformed position information in accordance with an inverse function of a second function, different from the first function, corresponding to the aspect ratio of the image; and a drawing step of drawing an image on the screen of the display apparatus.

6. A drawing apparatus for performing drawing on a screen of a display apparatus in response to a drawing input on the screen of the display apparatus, comprising:
 means for enabling a change in aspect ratio;
 first transforming mechanism for transforming drawing input position information representative of a position of a drawing input into first transformed position information based on a second function, different from a first function for normalizing an aspect ratio of an image displayed on the display apparatus, corresponding to the aspect ratio of the image displayed on the display apparatus which has been changed by the enabling means;
 second transforming mechanism for transforming the first transformed position information into second transformed position information in accordance with the first function; and
 transmitter for transmitting the second transformed position information to another apparatus via a network.

7. A drawing method for performing drawing on a screen of a display apparatus in response to a drawing input on the screen of the display apparatus, comprising:
 a step of enabling a change in aspect ratio;
 first transforming step of transforming drawing input position information representative of a position of a drawing input into first transformed position information based on a second function, different from a first function for normalizing an aspect ratio of an image displayed on the display apparatus, corresponding to the aspect ratio of the image displayed on the display apparatus which has been changed;
 second transforming step of transforming the first transformed position information into second transformed position information in accordance with the first function; and
 transmitting step of transmitting the second transformed position information to another apparatus via a network.

8. A computer-readable program to be encoded in a computer-readable medium, said program for causing a computer to execute the steps of a method for performing drawing on a screen of a display apparatus in response to a drawing input on the screen of the display apparatus, the method comprising:
 a step of enabling a change in aspect ratio;
 first transforming step of transforming drawing input position information representative of a position of a drawing input into first transformed position information based on a second function, different from a first function for normalizing an aspect ratio of an image displayed on the display apparatus, corresponding to the aspect ratio of the image displayed on the display apparatus which has been changed;
 second transforming step of transforming the first transformed position information into second transformed position information in accordance with the first function; and
 transmitting step of transmitting the second transformed position information to another apparatus via a network.

9. A recording medium having recorded thereon a computer-readable program for causing a computer to perform the steps of a method for performing drawing on a screen of a display apparatus in response to a drawing input on the screen of the display apparatus, the method comprising:
 a step of enabling a change in aspect ratio;
 first transforming step of transforming drawing input position information representative of a position of a drawing input into first transformed position information based on a second function, different from a first function for normalizing an aspect ratio of an image displayed on the display apparatus, corresponding to the aspect ratio of the image displayed on the display apparatus which has been changed;
 second transforming step of transforming the first transformed position information into second transformed position information in accordance with the first function; and
 transmitting step of transmitting the second transformed position information to another apparatus via a network.

10. A drawing apparatus for performing drawing on a screen of a display apparatus in response to position information transmitted from another apparatus and indicating a position on which drawing is performed, the apparatus comprising:
 means for enabling a change in aspect ratio;
 first transforming means for transforming the position information into first transformed position information in accordance a first function for normalizing an aspect ratio of an image displayed on the display apparatus which has been changed by the means for enabling;
 second transforming mechanism for transforming the first transformed position information into second transformed position information in accordance with a second function, different from the first function, corresponding to the aspect ratio of the image; and
 drawing mechanism for drawing a desired image on the screen of the display apparatus.

* * * * *

UNITED STATES PATENT AND TRADEMARK OFFICE
CERTIFICATE OF CORRECTION

| | | |
|---|---|---|
| PATENT NO. | : 7,212,219 B2 | |
| APPLICATION NO. | : 11/012465 | |
| DATED | : May 1, 2007 | |
| INVENTOR(S) | : Taizo Koutani and Masayuki Ishikawa | |

It is certified that error appears in the above-identified patent and that said Letters Patent is hereby corrected as shown below:

Title page, item [57]

On the second to last line of the Abstract, please delete "an";

In Column 1, Line 56, "are" should read --is--;

In Column 8, Line 16, insert --a-- immediately before "preferred";

In Column 8, Line 67, insert --be-- immediately before "wired";

In Column 10, Line 18, "are" should read --is--;

In Column 12, Line 24, the second occurrence of "a" should read --an--;

In Column 12, Line 53, "is" should read --are--;

In Column 14, Line 11, insert --transforms-- immediately after "section";

In Column 17, Line 17, insert --are the-- immediately before "same";

In Column 17, Line 18, insert --and-- immediately before "are";

In Column 17, Line 39, delete ",";

In Column 22, Line 52, "is" should read --are--;

UNITED STATES PATENT AND TRADEMARK OFFICE
CERTIFICATE OF CORRECTION

PATENT NO. : 7,212,219 B2
APPLICATION NO. : 11/012465
DATED : May 1, 2007
INVENTOR(S) : Taizo Koutani and Masayuki Ishikawa It is certified that error appears in the above-identified patent and that said Letters Patent is hereby corrected as shown below:

In Column 23, Line 1, "is" should read --are--;

Signed and Sealed this

Twenty-seventh Day of May, 2008

JON W. DUDAS
*Director of the United States Patent and Trademark Office*